(12) United States Patent
Thrasher et al.

(10) Patent No.: US 7,275,103 B1
(45) Date of Patent: Sep. 25, 2007

(54) STORAGE PATH OPTIMIZATION FOR SANS

(75) Inventors: Russell Thrasher, Raleigh, NC (US); Terence W. Noonan, Vadnais Heights, MN (US)

(73) Assignee: VERITAS Operating Corporation, Mountain View, CA (US)

( * ) Notice: Subject to any disclaimer, the term of this patent is extended or adjusted under 35 U.S.C. 154(b) by 859 days.

(21) Appl. No.: 10/323,395

(22) Filed: Dec. 18, 2002

(51) Int. Cl.
*G06F 15/173* (2006.01)

(52) U.S. Cl. .................. 709/224; 709/223; 709/238; 709/239

(58) Field of Classification Search ............... 370/244; 702/186; 709/223, 229, 224, 238, 239; 714/5, 714/43
See application file for complete search history.

(56) References Cited

U.S. PATENT DOCUMENTS

| | | | |
|---|---|---|---|
| 5,504,882 A * | 4/1996 | Chai et al. ................... | 714/5 |
| 5,640,582 A * | 6/1997 | Hays et al. .................. | 712/38 |
| 6,775,230 B1 * | 8/2004 | Watanabe et al. ........... | 370/228 |
| 6,829,685 B2 * | 12/2004 | Neal et al. .................. | 711/153 |

FOREIGN PATENT DOCUMENTS

WO    WO 02/088947    * 11/2002

* cited by examiner

*Primary Examiner*—Ario Etienne
*Assistant Examiner*—Hussein A El-chanti
(74) *Attorney, Agent, or Firm*—Robert C. Kowert; Meyertons, Hood, Kivlin, Kowert & Goetzel, P.c.

(57) ABSTRACT

Embodiments of a system and method for rule-based proactive storage path optimization for SANs. Embodiments may evaluate paths between an application and its storage on a SAN based on current and/or historical path quality of service. Performance of alternative paths may be monitored to determine if a better path than a path currently in use is available. If a better path is determined, then the path may be switched to the better path. In one embodiment, one or more zones may be reconfigured to migrate to a different path. Path migration may be performed automatically without user intervention. Alternatively, a user may be given the option to manually migrate to a new path. Embodiments may proactively change paths between an application and its storage before path performance becomes a problem. Embodiments may be integrated with a SAN management system or, alternatively, may be standalone mechanisms.

22 Claims, 17 Drawing Sheets

STORAGE PATH OPTIMIZATION FOR SANS

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

In a SAN environment, a path may be defined as a route through a SAN interconnect through which a SAN application communicates with its SAN storage. Determination and selection of optimum paths from storage to SAN applications using the storage may be difficult to achieve, especially in large SANs. SAN configuration may dynamically change, possibly creating bottlenecks, as a SAN grows. Prior art SAN systems may provide mechanisms for static path selection for SAN paths that may let a user select a fixed path manually based on search criteria such as the number of hops. These prior art mechanisms do not proactively monitor path metrics after the manual selection is made, and do not provide the ability to automatically determine and switch to better paths as the SAN changes. Thus, it is desirable to provide a mechanism to proactively identify SAN bottlenecks and to reconfigure SAN pathing "on the fly" to improve the flow of data through the SAN.

SUMMARY OF THE INVENTION

Embodiments of a system and method for rule-based proactive storage path optimization for SANs are described. Embodiments may evaluate paths between an application and its storage on a SAN based on current and/or historical path quality of service. Performance of two or more alternative paths may be monitored and the quality of service of the paths may be compared to determine if a better path than a path currently in use is available. If a better path is determined, then the path between the application and its storage may be switched to the better path. One embodiment may be implemented as a storage path monitor.

In one embodiment, paths may be defined by zones within the SAN fabric, and fabric zones may be reconfigured to migrate to a different path. Embodiments may use either or both of hard zoning and soft zoning to control paths within a fabric depending upon the user's desired configuration and/or upon which method of zoning the fabric switch vendor(s) support. In one embodiment, path migration may be performed automatically without user intervention. In another embodiment, a user may be notified of the better path so that the user may be given the option to choose whether to migrate to a new path.

In one embodiment, performance metrics may be monitored for two or more alternative paths, and a history of performance for the paths may be developed from the monitored metrics. Optimum path configurations may be selected based on the collected and/or generated performance metrics for the alternative paths. In one embodiment, one or more selection rules may be applied to the collected and/or generated performance metrics for the alternative paths to determine if a better path between an application and its storage than a path currently in use is available. As path statistics and/or performance metrics change, if it is determined that a different one of the alternative paths may provide better quality of service than the current path between an application and its storage, the application may be migrated to the different path between the application and its storage to preferably provide better quality of service for data transfers.

One embodiment may be configured to proactively change paths between an application and its storage before path performance becomes a problem. Performance data on path components such as switches may be monitored to determine the load on alternative paths. If the load on a path currently in use is determined to be high (e.g. above a high load threshold), the path between an application and its storage may be switched to a path for which the load is lower. One embodiment may collect and examine historical data on path utilization for two or more alternative paths to determine if there are periods when path performance historically is problematic. Historical data may be examined to determine if an alternative path may provide better quality of service during the problematic periods. If an alternative path that may provide better quality of service is identified, migration to the alternative path may be performed prior to the problematic period. After the period, the path may be changed back to the "regular" path.

In one embodiment, a storage path monitor may be integrated with a SAN management system. In another embodiment, a storage path monitor may be a standalone module that uses SAN component APIs to monitor the SAN components and perform zoning operations to provide alternative paths between an application and its storage. In yet another embodiment, a storage path monitor may be a standalone module that uses SAN component APIs to monitor the SAN components and interacts with APIs for one or more zoning mechanisms of a SAN management system to reconfigure one or more zones to provide alternative paths between an application and its storage.

BRIEF DESCRIPTION OF THE DRAWINGS

The following detailed description makes reference to the accompanying drawings, which are now briefly described.

Figure 1:
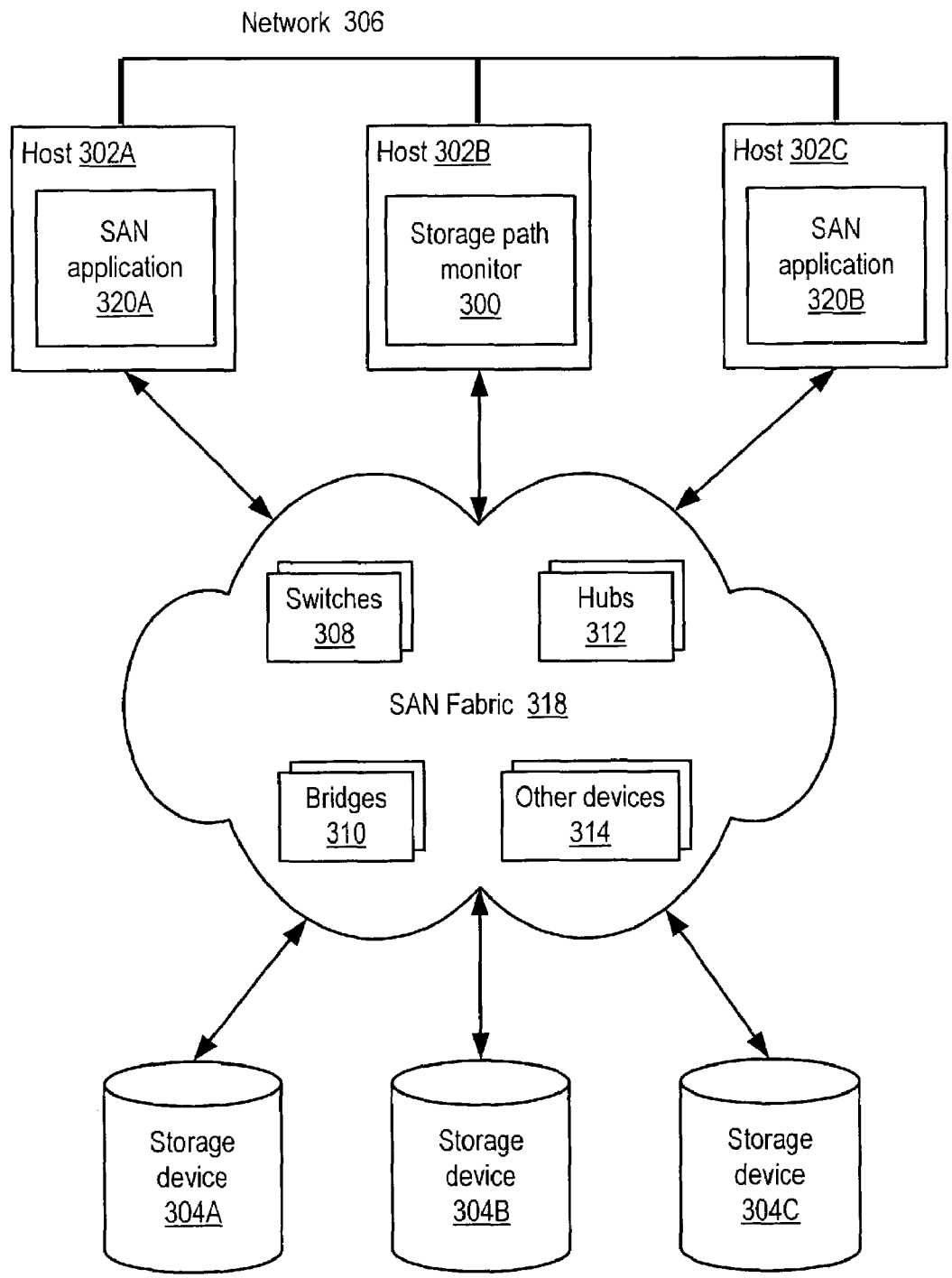
FIG. 1 illustrates an exemplary SAN implementing an embodiment of a storage path monitor according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for rule-based proactive storage path optimization for SANs are described. In a SAN environment, a path may be defined as a route through a SAN interconnect through which a SAN application communicates with its SAN storage. Embodiments of a storage path monitor may evaluate paths on a SAN based on current and/or historical path quality of service. Performance of two or more alternative paths between an application and its storage may be monitored and the quality of service of the paths may be compared to determine if a better path than a path currently in use is available. If a better path is determined, then the path between the application and its storage may be switched to the better path.

In one embodiment, two or more alternative paths from a SAN application to target storage may be determined. Embodiments may provide means for determining quality of service for each of the determined paths. In one embodiment, to determine quality of service, performance metrics may be monitored for the paths, and a history of performance for the paths may be developed from the monitored metrics. Monitored path performance metrics may include directly measured performance metrics (e.g. error metrics and status metrics) and statistical or other performance metrics computed from directly measured attributes collected over a period. In general, any path performance metric that may be related to the quality of service of a path may be monitored. Collected path performance metrics may be used to generate statistical or other performance metrics for the path. Optimum path configurations may be selected based on the collected and/or generated performance metrics for the alternative paths.

Statistical performance metrics that may be monitored may include one or more of, but are not limited to, port utilization, total number of frames transmitted, total number of frames received, class 1 frames dropped, class 2 frames dropped, class 3 frames dropped, class 1 frames rejected, class 2 frames rejected, link resets transmitted, class 1, 2 & 3 frames received, buffer credit not received, buffer credit not provided, etc. Error performance metrics that may be monitored may include one or more of, but are not limited to, CRC errors, address errors, encoding disparity errors, delimiter errors, frames too long, frames truncated, invalid transmission words, primitive sequence protocol errors, etc. Status performance metrics that may be monitored may include one or more of, but are not limited to, switch port status, device port status, device status, connectivity status, IP status, link failures, synchronization loss detectors, power supply failure, etc.

Collection of performance metrics may be performed using in-band and/or out-of-band mechanisms. In one embodiment, these collection mechanisms may include in-band mechanisms that may employ logical or physical connectivity to collect information from the various hardware components of the SAN. In one embodiment, these collection mechanisms may include out-of-band mechanisms that are independent of the connectivity of the in-band path including one or more of, but not limited to, SNMP, telnet sessions to hardware telnet interfaces and connections to web base hardware interfaces.

Embodiments may provide means for determining an alternative path predicted to provide a higher quality of service than a currently used path. In one embodiment, one or more selection rules may be applied to the collected and/or generated performance metrics for the alternative paths to determine if a better path between an application and its storage than a path currently in use is available. As path statistics and/or performance metrics change, if it is determined that a different one of the alternative paths that may provide better quality of service than the current path between an application and its storage, the application may be migrated to the different path between the application and its storage to preferably provide higher quality of service for data transfers.

In one embodiment, a group of two or more redundant paths that provide redundancy for data transmission between an application and its storage may be monitored to determine quality of service provided by the paths. Other alternative paths may also be monitored. If quality of service of one of the redundant paths falls below a quality of service threshold, a monitored alternative path which may provide higher quality of service than the redundant path with low quality of service (and not currently in the group of redundant paths) may be identified to replace the problem path in the group of redundant paths to preferably maintain the quality of service requirements for the group of redundant paths.

Embodiments may provide means for changing the paths so that an application accesses its storage via an alternative path to preferably provide higher quality of service for data transfers. In one embodiment, paths may be defined by zones within the SAN fabric, and fabric zones may be reconfigured to migrate to a different path. While embodiments are generally described herein as using zoning to modify and/or create paths, it is noted that other embodiments may use other mechanisms than zoning for modifying existing paths and/or creating new paths to migrate to different paths. Some embodiments may use combinations of two or more mechanisms to create and/or modify paths. In general, embodiments may use any mechanism available in a SAN to modify and/or create paths. In one embodiment, path migration may be performed automatically without user intervention. In another embodiment, a user may be notified of the better path so that the user may be given the option to choose whether to migrate to a new path. In one embodiment, a storage path monitor may be configured to allow either or both user notification of and switching to determined better paths and automatic switching to determined better paths.

One embodiment of a system and method for rule-based proactive storage path optimization for SANs may be implemented as a storage path monitor on one or more systems coupled to a SAN. FIG. 1 illustrates an exemplary SAN implementing an embodiment of a storage path monitor according to one embodiment. For one embodiment, SAN may be described as a high-speed, special-purpose network that interconnects storage devices 304 (e.g. storage devices 304A, 304B, and 304C) with associated data servers (e.g. hosts 302A, 302B, and 302C) on behalf of a larger network of users. A SAN may employ Fibre Channel technology. A SAN may include one or more hosts 302 (e.g. hosts 302A, 302B, and 302C), one or more storage devices 304 (e.g. storage devices 304A, 304B, and 304C), and one or more SAN fabrics 318. One or more end-user platforms (not shown) may access the SAN, typically via a LAN or WAN connection to one or more of the hosts 302.

Storage devices 304 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Hosts 302 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 302 is typically connected to the fabric 318 via one or more Host Bus Adapters (HBAs). SAN fabric 100 may enable server-to-storage device connectivity through Fibre Channel switching technology. SAN fabric 318 hardware may include one or more fabric components (e.g. switches 308, bridges 310, hubs 312, or other devices 314 such as routers), as well as the interconnecting cables (for Fibre Channel SANs, fibre optic cables).

Host systems 302 may include one or more SAN applications 320 such as SAN application 320A on host 302A and SAN application 320B on host 302C. One or more host system 302 may each include an instance of the storage path monitor 300; in this example host 302B includes an instance of storage path monitor 300.

Figure 2:
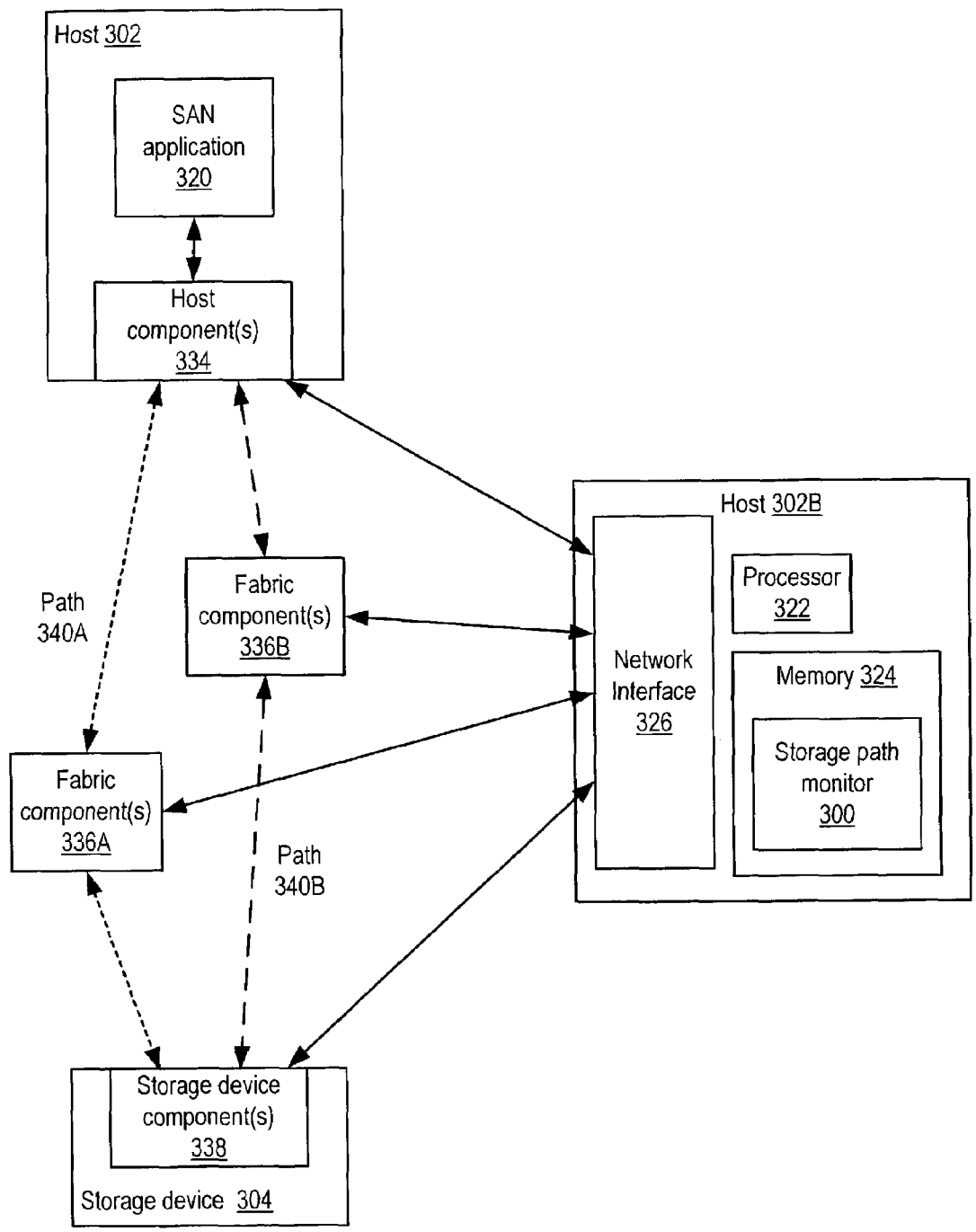
FIG. 2 illustrates an exemplary SAN with a host system including a storage path monitor according to one embodiment.

FIG. 2 illustrates an exemplary SAN with a host system including a storage path monitor according to one embodiment. Host systems 302 may be any of various types of devices, including, but not limited to, a personal computer system, desktop computer, laptop or notebook computer, mainframe computer system, workstation, network appliance, network computer, Internet appliance, or other suitable device. Host system 302B may include at least one processor 322. The processor 322 may be coupled to a memory 324. Memory 324 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 302B may include, in memory 324, a storage path monitor 300.

Host system 302B may couple to one or more SAN components such as other hosts 302, storage devices 304, backup devices 330, fabric components including switches 308, and other SAN components via network interface 332. Network interface 332 may include one or more network connections to one or more different types of communications networks. Storage path monitor 300 may monitor components of one or more paths 340 such as path 340A and path 340B via one or more in-band and/or out-of-band network connections. Host system 302B may couple to the SAN components via one or more out-of-band network connections (e.g. Ethernet, LAN, WAN or other network connections). Host system 302B may also couple to the SAN components via one or more in-band network connections. In-band refers to transmission of a protocol other than the primary data protocol over the same medium (e.g. Fibre Channel) as the primary data protocol of the SAN. Out-of-band refers to transmission of information among SAN components outside of the Fibre Channel network, typically over Ethernet, on a LAN, WAN, or other network. Host system 302B may also couple to one or more storage devices 304 via Fibre Channel through the SAN fabric for SAN data transmission using the primary data protocol.

In one embodiment, more than one host system 302 may include instances of storage path monitor 300. While this example illustrates the storage path monitor 300 on host system 302B of the SAN, in some embodiments, the storage path monitor may reside on a non-host (e.g. end-user) system coupled to the SAN via a LAN or WAN connection to one or more of the host systems 302.

An instance of storage path monitor 300 may determine and monitor two or more alternative paths 340 (e.g. paths 340A and 340B) on the SAN between an application 320 and its storage to collect path performance metrics from components of the path(s) 340. Path components that may be monitored may include one or more of, but are not limited to, Host Bus Adapters (HBAs), HBA ports, switches 308, switch ports, hubs 312, bridges 310, LUNs, storage device ports, and in general any component that may be part of a path between an application and its storage. In one embodiment, storage path monitor 300 may monitor SAN components by communicating with the SAN components via one or more in-band and/or out-of-band communication channels. In one embodiment, storage path monitor 300 may generate and store information describing the path(s) 340 and indicating the member components in the path(s) 340. In one embodiment, this information may be stored in one or more database tables.

For each SAN component on a path, storage path monitor 300 may monitor one or more component performance metrics. Monitored component performance metrics may include one or more of, but are not limited to, throughput, bytes transferred, error rates, frames dropped, etc. Monitored component performance metrics may include directly measured performance metrics (e.g. throughput, bytes transferred, frames dropped, etc.) and statistical or other performance metrics computed from directly measured attributes collected by the component over a period (e.g. error rates, frame rates, etc.) In general, any component performance metric that may be related to the quality of service of a path may be monitored. In one embodiment, storage path monitor 300 may generate statistical or other performance metrics from the collected component performance metrics. For example, a particular performance metric may be collected from a particular component of a path over a period and used to generate a mean or median for the performance metric over the period. As another example, a performance metric may be collected from two or more path components and used to generate a combined performance metric for the two or more components. As yet another example, a ratio of two separately collected performance metrics may be generated.

Storage path monitor 300 may compare the collected and/or generated performance metrics for the alternative paths to determine if there is a better path available based on quality of service than the path currently in use between an application and its storage. As path statistics and/or performance metrics change, if the storage path monitor 300 determines an alternative path that may provide better quality of service than the current path between an application and its storage, the application may be migrated to the different path between the application and its storage to preferably provide better quality of service for data transfers. In one embodiment, path migration may be performed automatically without user intervention. In another embodiment, a user may be notified of the better path so that the user may be given the option to choose whether to migrate to a new path. In one embodiment, storage path monitor 300 may be configured to allow either or both user notification of and switching to determined better paths and automatic switching to determined better paths.

In one embodiment, one or more selection rules may be applied to the collected and/or generated performance metrics for the alternative paths to determine if a better path between the application and its storage than a path currently in use is available. In one embodiment, the selection rules may compare the performance metrics to one or more thresholds for the performance metrics to determine relative quality of service for the alternative paths. In one embodiment, there may be a quality of service low threshold that may be used by the selection rules to identify paths currently in use that have fallen below the quality of service low threshold. In one embodiment, there may be a quality of service high threshold that may be used by the selection rules to identify alternative paths to the current path. If, for the current path, one or more of the performance metrics are exceeding thresholds for the performance metrics that indicate quality of service for the current path may be adversely affected or is being adversely affected, storage path monitor 300 may look for an alternative path that may offer higher quality of service than the current path. In one embodiment, storage path monitor 300 may attempt to identify an alternative path for which the predicted quality of service is above a high quality of service threshold. This may preferably prevent switching to an alternative path that may only provide marginal improvement in quality of service over the current path. In one embodiment, the path may be defined by a fabric zone, and the zone may be reconfigured to use the switch port with the lower traffic rate.

In one embodiment, storage path monitor 300 may perform path modification if quality of service for the path stays below a quality of service low threshold for the path for a given time period. In one embodiment, the time period may be set to range from 0 (to cause immediate path modification when the quality of service falls below the low threshold) to a duration of seconds, minutes, hours, days, etc. In one embodiment, the quality of service for a path may be averaged over a given time period, and the average compared to the quality of service low threshold to determine if path modification may be performed. In one embodiment, the computed average for the quality of service may be required to remain below the quality of service low threshold for a given time period for path modification to be performed. Similarly, in one embodiment, storage path monitor 300 may select alternative paths that have maintained a high quality of service for a given time period to replace existing paths with low quality of service. In one embodiment, if two or more alternative paths have maintained a high quality of service (e.g. above a high quality of service threshold), an alternative path that has maintained high quality of service for the longest time period may be selected. Other embodiments may use other methods to select from among alternative paths.

As an example of applying selection rules to the collected and/or generated performance metrics for the alternative paths to determine if a better path between the application and its storage than a path currently in use is available, one embodiment may look at utilization of the path and/or the components of the path. If the utilization reaches or passes a certain percentage of the total throughput possible for the path or a component of the path (i.e. reaches or passes a high utilization threshold), and an alternative path with lower utilization is found, storage path monitor 300 may switch usage to the alternative path. In one embodiment, storage path monitor 300 may only switch usage to an alternative path if an alternative path with utilization below a low utilization threshold is found. In one embodiment, storage path monitor 300 may attempt to identify and switch to an alternative path only if the utilization stays at or above a certain percentage of the total throughput possible for the path or a component of the path for a given time period (e.g. a given number of seconds, minutes, days, etc.). In one embodiment, storage path monitor 300 may maintain an average utilization for the current path over a given time period, and may attempt to identify and switch to an alternative path only if the average utilization stays at or above a certain percentage of the total throughput possible for the path or a component of the path for a given time period. For example, if traffic rate on a particular switch port is greater than 90% of the maximum throughput allowed (e.g. above a high traffic rate threshold), then storage path monitor 300 may attempt to determine and switch to an alternative path that uses a switch port that has a lower traffic rate (e.g., below a low traffic rate threshold of, for example, 10%). As another example, if traffic rate on a particular switch port stays above a high traffic rate threshold for a given time period (e.g. 30 seconds), then storage path monitor 300 may attempt to determine and switch to an alternative path that uses a switch port that has a lower traffic rate (e.g., below a low traffic rate threshold of, for example, 10%).

Storage path monitor 300 may monitor path performance and proactively tune the path performance based on quality of service statistics. In one embodiment, storage path monitor 300 may be configured to proactively change paths between an application and its storage before path performance becomes a problem. Performance data on path components such as switches may be monitored by storage path monitor 300 to determine the load on alternative paths. If the load on a path currently in use is determined to be high (e.g. above a high load threshold), storage path monitor 300 may switch to a path for which the load is lower (e.g. below a low load threshold). In one embodiment, storage path monitor 300 may collect and examine historical data on path utilization for two or more alternative paths to determine if there are periods (e.g. days of the week, hours of the day, etc.) when path performance historically is problematic. Storage path monitor 300 may examine the historical data to determine if an alternative path may provide better quality of service during the problematic periods. If an alternative path that may provide better quality of service is identified, storage path monitor 300 may schedule migration to the alternative path prior to the problematic period. After the period, storage path monitor 300 may change the path back to the "regular" path. For example, if one path between an application and its storage is determined to have a high load rate for a particular period (e.g. on a particular day), and another path is determined to have a low load rate for the same period, storage path monitor 300 may move data transmission between the application and its storage to the low traffic path for the period.

The following describes an exemplary scenario for proactively using embodiments of a storage path monitor to improve quality of service in a SAN and is not intended to be limiting. Storage path monitor 300 may monitor traffic on two or more paths in a SAN between an application and its storage. If it is determined that a path used by a critical application has high throughput on a certain day of the week, storage path monitor 300 may schedule a path migration to a lower-utilized path before that day. Storage path monitor 300 may then perform the migration when scheduled, and may revert back to the original "regular" path after the day is over.

Figure 3A:
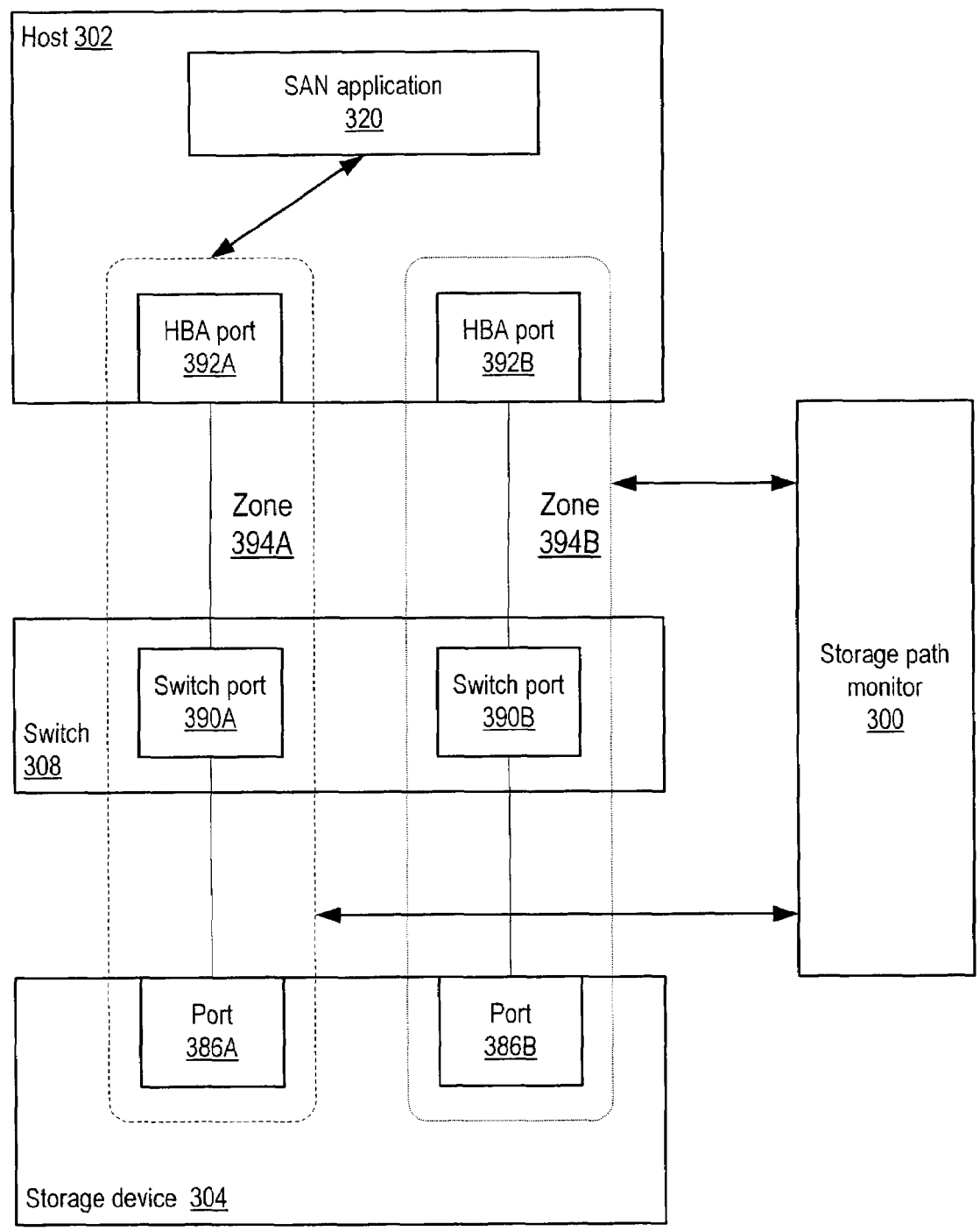
FIGS. 3A and 3B illustrates a storage path monitor switching zones defining paths to provide better quality of service between an application and its storage according to one embodiment.

In one embodiment, paths may be defined by zones in the SAN fabric. FIG. 3A illustrates an exemplary SAN with zones defining paths according to one embodiment. A zone 394 is a set of objects within a SAN fabric that can access one another. By creating and managing zones 394, host access to storage resources may be controlled. Zoning-enabled fabrics may include zoning tables that define each zone along with its member objects. In one embodiment, zones 394 and their member objects may be defined in zoning tables within the switches (e.g. switch 308) on the SAN fabric. When zoning is implemented on a SAN fabric, the switches (e.g. switch 308) consult the zoning table to determine whether one object is permitted to communicate with another object, and restrict access between them unless they share a common membership in at least one zone 394. Fabric zoning occurs at the level of individual nodes or ports attached to the SAN fabric.

Zoning may be performed using one or both of soft zoning and hard zoning in a fabric. Soft zoning, also called advisory zoning, may be enforced simply by filtering the visibility of objects on the SAN so that an object can only see other objects that share at least one zone membership with the object. In hard zoning, a Fibre Channel switch 308 may actively block access to zone members from any objects outside the zone. This may be performed at the level of ports 390 on the switch 308. Hard zoning may also be referred to as switch port zoning. Embodiments of storage path monitor 300 may use either or both of hard zoning and soft zoning to control paths within a fabric depending upon the user's desired configuration and/or upon which method of zoning the fabric switch vendor(s) support.

Figure 3B:
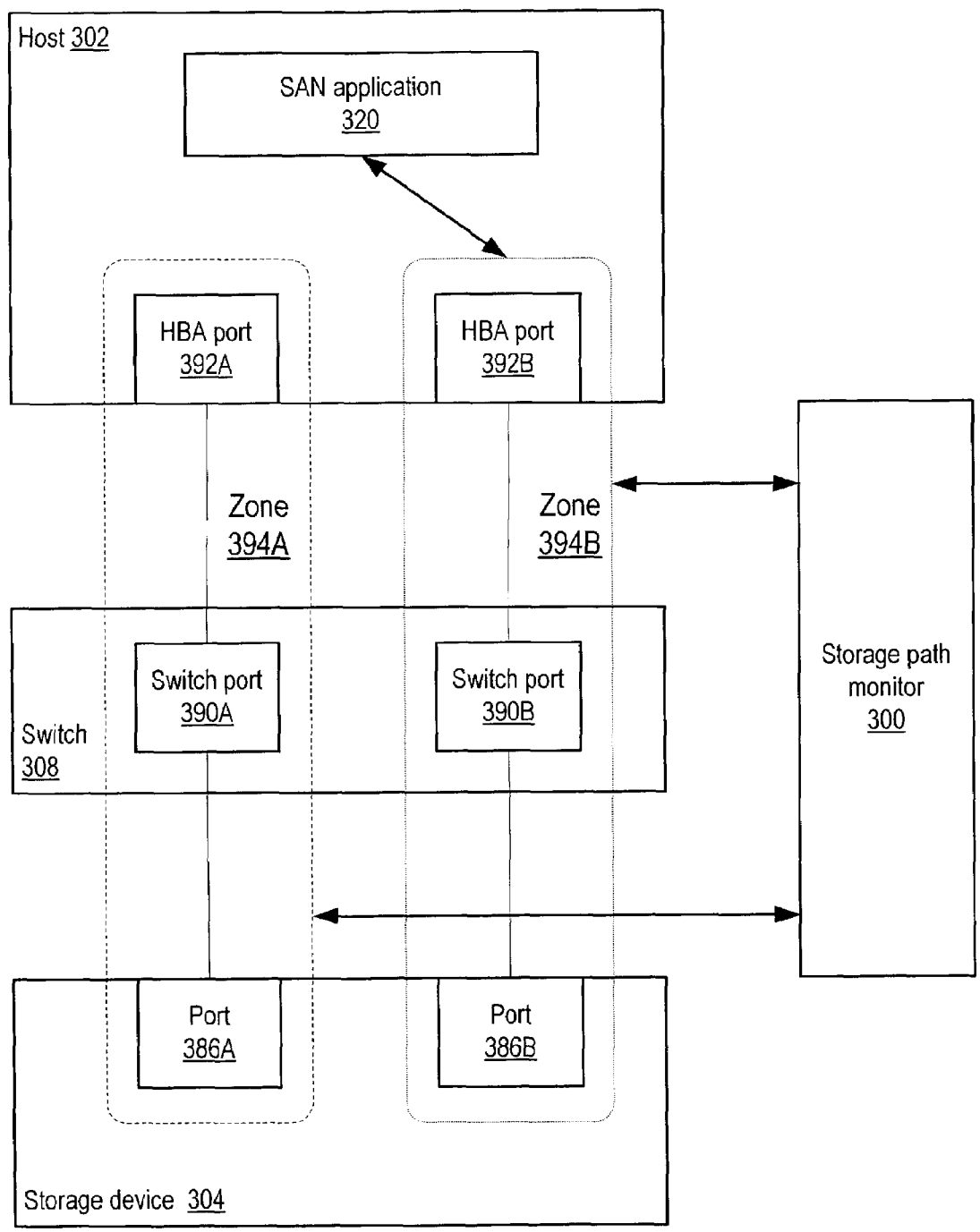

A fabric may include more than one zone 394, and two or more zones may provide alternative paths between an application and its storage. In FIG. 3A, two zones 394A and 394B are shown as alternative paths between application 320 on host 302 and the application's storage on storage device 304. In this example, zone 394A includes HBA port 392A on host 302, switch port 390A on switch 308, and port 386A on storage device 304. Zone 394B includes HBA port 392B on host 302, switch port 390B on switch 308, and port 386B on storage device 304. Note that zones may include more than one of HBA ports 392, switch ports 390, and storage device ports 386. In one embodiment, storage path monitor 300 may determine that an alternative path defined by another zone 394 may provide better quality of service than a path defined by the zone 394 currently in use, and the application 320 may be migrated to use the alternative path in the other zone 394. For example, zone 394A may be currently in use as the path for data transmission between application 320 and its storage on storage device 304. Storage path monitor 300 may monitor performance metrics of components in both zones 394A and 394B. The monitored performance metrics and one or more generated performance metrics may be applied to one or more selection rules to determine the quality of service of the two paths defined by zones 394A and 394B. If it is determined that the path defined by zone 394B may offer better quality of service than the path defined by zone 394B, then storage path monitor 300 may switch application 320 to use the alternative path defined by zone 394B for data transmission between application 320 and its storage on storage device 304 as illustrated in FIG. 3B.

In one embodiment, fabric zones may be reconfigured to migrate to an alternative path that may provide better quality of service. In this embodiment, fabric components may be rezoned to force migration to an alternative path between an application and its storage that may provide better quality of service than a path currently in use. One or more components (e.g. switch ports) may be removed and/or added to one or more existing zones, or alternatively a new zone may be created, to provide the alternative path between the application and its storage.

Figure 4A:
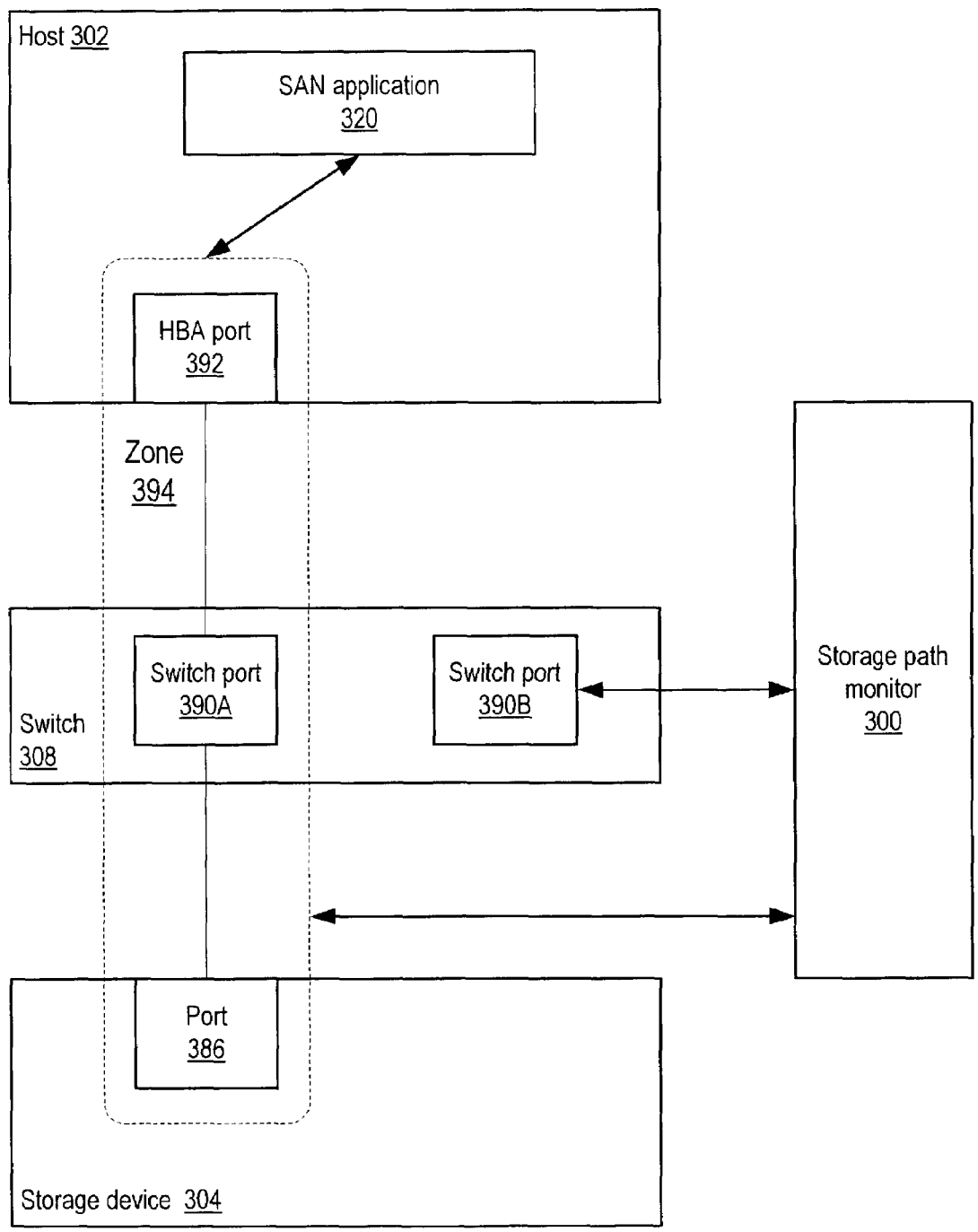
FIGS. 4A and 4B illustrates a storage path monitor reconfiguring a zone defining a path to provide better quality of service between an application and its storage according to one embodiment.
Figure 4B:
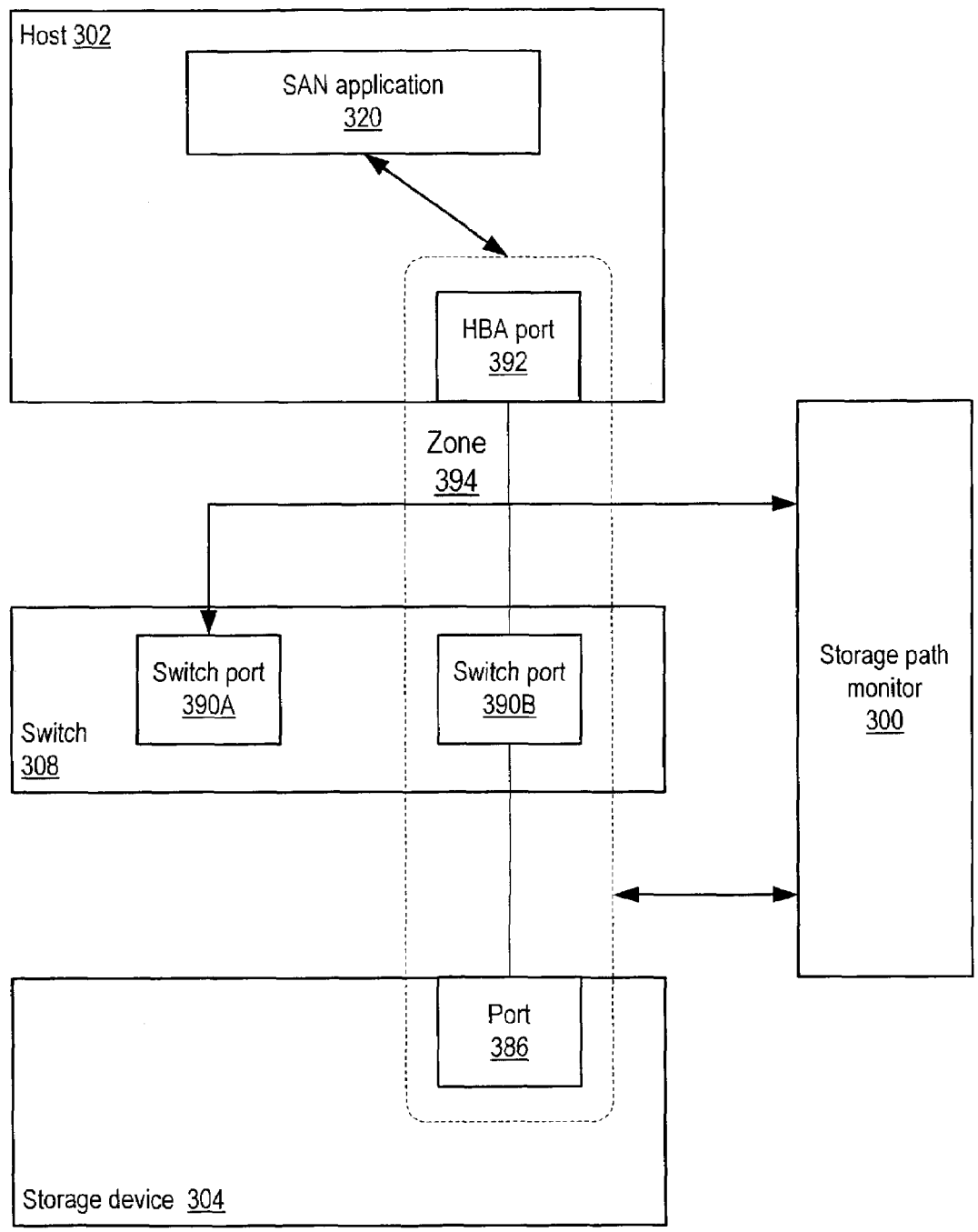

FIG. 4A illustrates an exemplary SAN with a zone defining a path according to one embodiment. In this example, zone 394 includes HBA port 392 on host 302, switch port 390A on switch 308, and port 386 on storage device 304. In one embodiment, storage path monitor 300 may determine that reconfiguring zone 394 may provide better quality of service than is currently provided by the path defined by the zone 394. For example, zone 394 may be currently in use as the path for data transmission between application 320 and its storage on storage device 304. Storage path monitor 300 may monitor performance metrics of components in zone 394 (e.g. HBA port 392, switch port 390A, and port 386) as well as other components such as switch port 390B. The monitored performance metrics and one or more generated performance metrics may be applied to one or more selection rules to determine the quality of service of the path defined by zone 394 as well as one or more alternative paths which may be defined by modifying zone 394, such as a path including HBA port 392, switch port 390B, and port 386. If it is determined that an alternative path including HBA port 392, switch port 390B, and port 386 may offer better quality of service than the path currently defined by zone 394, then storage path monitor 300 may replace switch port 390A with switch port 390B in zone 394 to use the alternative path defined by modified zone 394 for data transmission between application 320 and its storage on storage device 304 as illustrated in FIG. 4B.

Figure 5A:
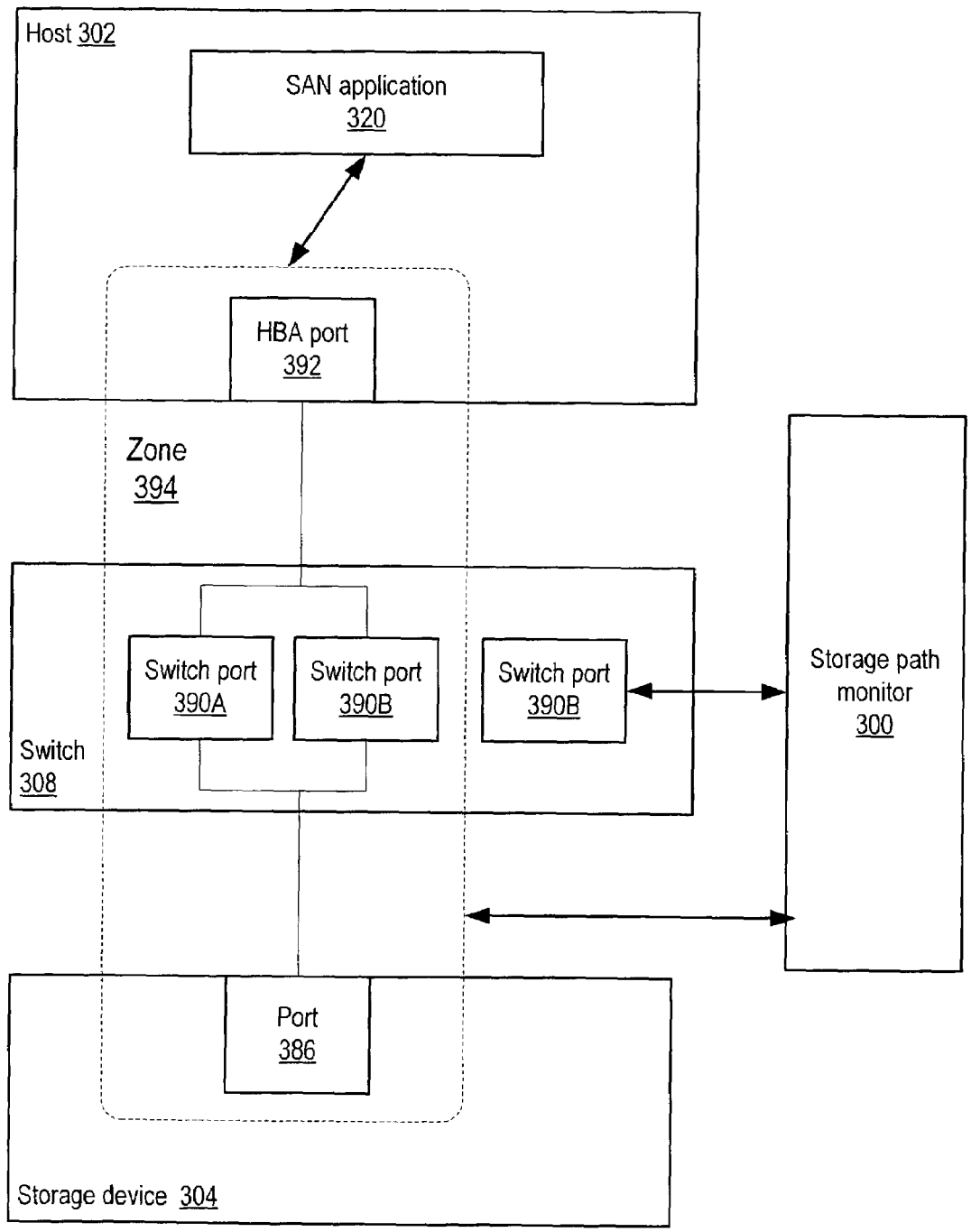
FIGS. 5A and 5B illustrate a storage path monitor adding a switch port to a zone supporting load-balanced switch ports to provide better quality of service between an application and its storage according to one embodiment.
Figure 5B:
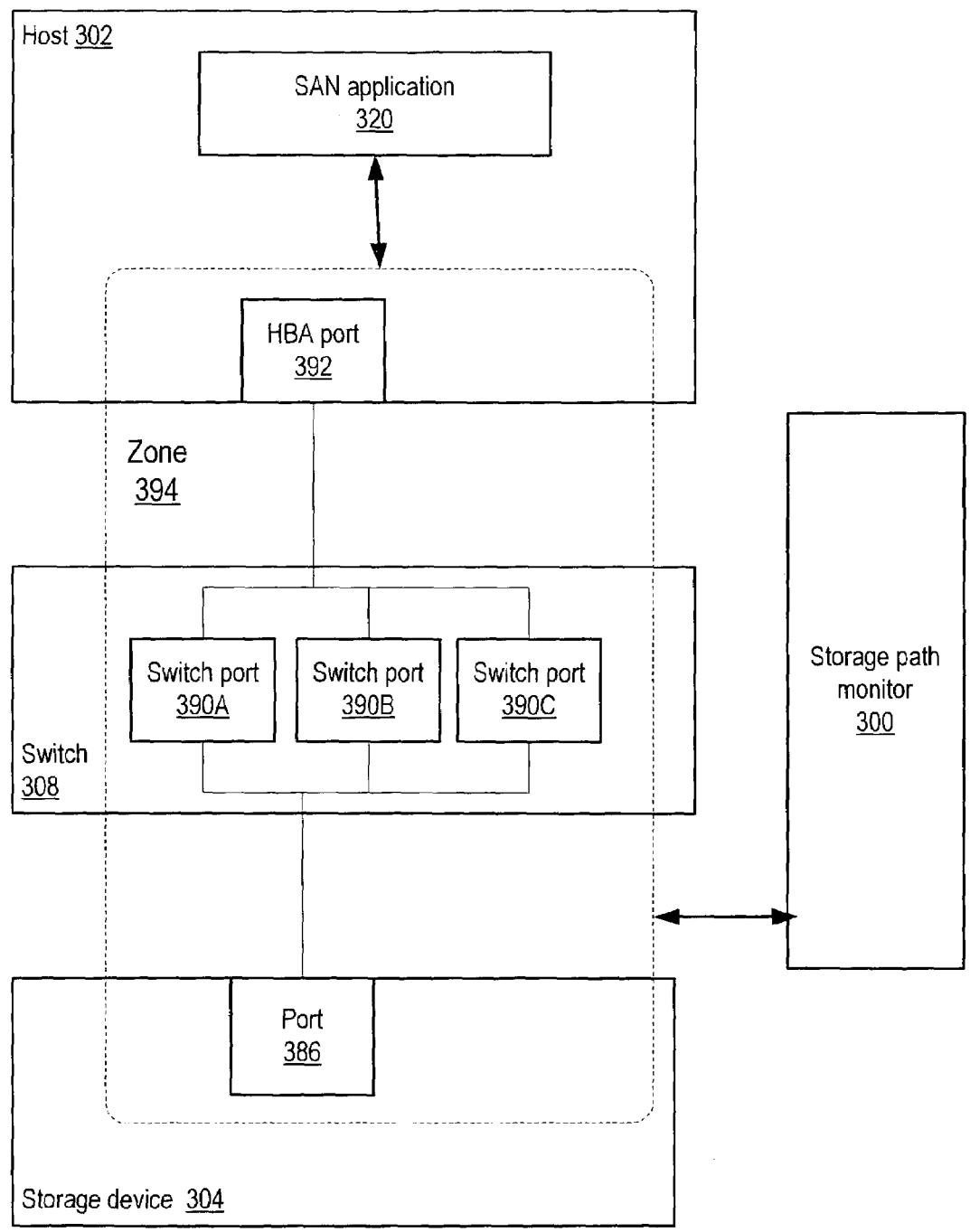

Some fabric components (e.g. switches) may perform load balancing between two or more ports in a zone. Data transmitted on a path defined by this zone between an application and its storage may pass through these ports as determined by the load balancing mechanism of the fabric component. FIG. 5A illustrates an exemplary SAN with a zone defining a path and including load-balanced switch ports according to one embodiment. Zone 394 may be currently in use as the path for data transmission between application 320 and its storage on storage device 304. Zone 394 may include HBA port 392 on host 302, load-balanced switch ports 390A and 390B on switch 308, and port 386 on storage device 304. Storage path monitor 300 may monitor performance metrics of components in zone 394 (e.g. HBA port 392, load-balanced switch ports 390A and 390B, and port 386), as well as other components such as switch port 390C. In one embodiment, storage path monitor 300 may monitor the load balanced switch ports 390A and 390B and, for example, may determine that utilization of the load balanced ports is exceeding a throughput threshold, for example by applying monitored port performance metrics to one or more selection rules. In one embodiment, storage path monitor 300 may reconfigure the zone 394 by adding one or more additional switch ports to the load balanced ports 394. In this example, storage path monitor 300 may add switch port 390C to zone 394, as illustrated in FIG. 5B. After reconfiguration, some or all of the data transmitted on the path defined by zone 394 between application 320 and its storage may pass through the added switch port(s) as determined by the load balancing mechanism of the switch 308 to preferably provide better quality of service on the path defined by zone 394.

A zone may include alternative paths between an application and its storage. For example, two or more ports of a fabric component (e.g. a switch) may be included in a zone. Each of the ports may represent a different path between an application and its storage. Some fabric components (e.g. switches) may provide an API through which the fabric component may be directed to use a particular port for a path. In one embodiment, storage path monitor 300 may determine that an alternative path in a zone through a first port on a fabric component may provide better quality of service than a currently used path through a second port on the fabric component. If this fabric component provides an API through which the fabric component may be directed to use a particular port for a path, storage path monitor 300 may direct the fabric component to use the first port to provide the alternative path between the application and its storage.

Figure 6:
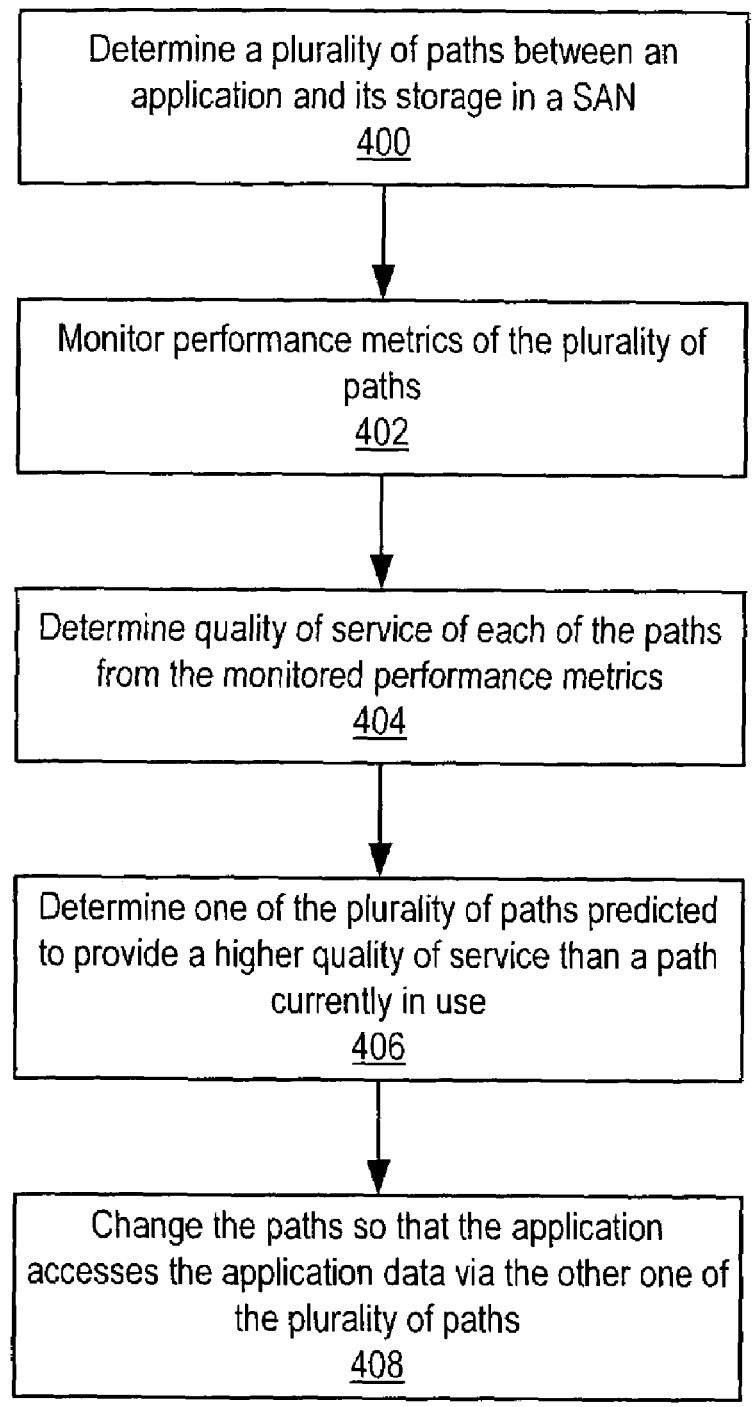
FIG. 6 is a flowchart illustrating a method for storage path optimization in SANs according to one embodiment.

FIG. 6 is a flowchart illustrating a method for storage path optimization in SANs according to one embodiment. As indicated at 400, a plurality of paths between an application on a host system and its application data on a storage device in a SAN may be determined. The application may currently access the application data via one of the plurality of paths. As indicated at 402, performance metrics (e.g. throughput, bytes transferred, error rates, frames dropped, etc.) of the plurality of paths may be monitored. In one embodiment, to monitor performance metrics of the plurality of paths, one or more performance metrics of one or more components of each path may be monitored. As indicated at 404, quality of service of each of the paths may be determined from the monitored performance metrics. As indicated at 406, an alternative one of the plurality of paths predicted to provide a higher quality of service than the current path may be determined. In one embodiment, to determine the alternative path, one or more selection rules may be applied to the performance metrics of each of the monitored paths. As indicated at 408, the paths may be changed so that the application accesses the application data via the alternative path to preferably provide a higher quality of service than the current path. In one embodiment, the paths may be changed to the alternative path if the current path is performing (or, alternatively, is predicted to perform) below a quality of service low threshold. In one embodiment, the paths may be changed to the alternative path if the current path is performing (or, alternatively, is predicted to perform) below a quality of service low threshold and the alternative path is predicted to perform above a quality of service high threshold. In one embodiment, the paths are defined by zones on the SAN fabric, and, to change the paths, one or more of the zones may be reconfigured so that the application accesses the application data via the alternative path.

One embodiment of a system and method for rule-based proactive storage path optimization for SANs may be implemented in a SAN management system such as the exemplary SAN management system described below. In one embodiment, a storage path monitor may be implemented in a SAN management server such as the SAN management server of the exemplary SAN management system described below. In one embodiment, a SAN management system such as the exemplary SAN management system described below may discover information for SAN components including, but not limited to, hosts, storage devices, and fabric devices (e.g. switches), and the discovered information may be accessed by the storage path monitor and used in determining paths to monitor, components of paths to be monitored, and performance metrics of the components to be monitored. In one embodiment, path information may be stored in and accessed from a database of a SAN management system, for example, a SAN access layer data store of the exemplary SAN management system described below.

In one embodiment, a SAN management system such as the exemplary SAN management system described below may collect usage and other performance-related metrics from the path components that the storage path monitor is monitoring, for example using collectors of a SAN access layer of the exemplary SAN management system described below, and provide the collected performance metrics to the storage path monitor. In one embodiment, a SAN management system such as the exemplary SAN management system described below may store the collected performance metrics in a database, and the storage path monitor may access the database to obtain the desired performance metrics. In one embodiment, a SAN management system such as the exemplary SAN management system described below may generate historical performance information in a database, which may be accessed by the storage path monitor to perform analysis of historical quality-of-service performance. In one embodiment, the storage path monitor may then use the collected path performance metrics to generate statistical or other performance metrics for the paths being monitored. Optimum path configurations may be selected based on the collected and/or generated performance metrics for the alternative paths. In one embodiment, one or more selection rules may be applied to the collected and/or generated performance metrics for the alternative paths to determine if a better path between an application and its storage than a path currently in use is available.

In one embodiment, a SAN management system such as the exemplary SAN management system described below may provide one or more mechanisms for managing and configuring zones, such as a zone utility and a LUN security utility, both described below for the exemplary SAN management system. In one embodiment, storage path monitor may interact with APIs for one or more of these zoning mechanisms to reconfigure one or more zones to provide an alternative path between an application and its storage that may provide better quality of service than a path currently in use.

In one embodiment, rather than automatically reconfiguring zones, storage path monitor may inform a user of the SAN management system of an alternative path that may provide better quality of service than a path currently in use and thus allow the user to decide whether to switch to the alternative path. In one embodiment, to inform the user, storage path monitor may send a message to a management console such as the SAN manager of the exemplary SAN management system described below. In one embodiment, the user may then instruct storage path monitor to reconfigure the one or more zone(s) to provide the alternative path between an application and its storage. Alternatively, the user may use one or more zoning mechanisms provided by the SAN management system to manually reconfigure the zone(s), if desired.

In one embodiment, storage path monitor may be integrated with a SAN management system such as the exemplary SAN management system described below. In another embodiment, storage path monitor may be a standalone module that uses SAN component APIs (such as fabric switch APIs) to monitor the SAN components and perform zoning operations to provide alternative paths between an application and its storage. In yet another embodiment, storage path monitor may be a standalone module that uses SAN component APIs (such as fabric switch APIs) to monitor the SAN components and interacts with APIs for one or more zoning mechanisms of a SAN management system such as the exemplary SAN management system described below to reconfigure one or more zones to provide alternative paths between an application and its storage.

While embodiments are generally described herein in regards to SANs and SAN applications, it is noted that embodiments may be implemented in other network environments to provide service-level monitoring for scheduled data transfer tasks in those environments.

SAN Management System

Figure 7:
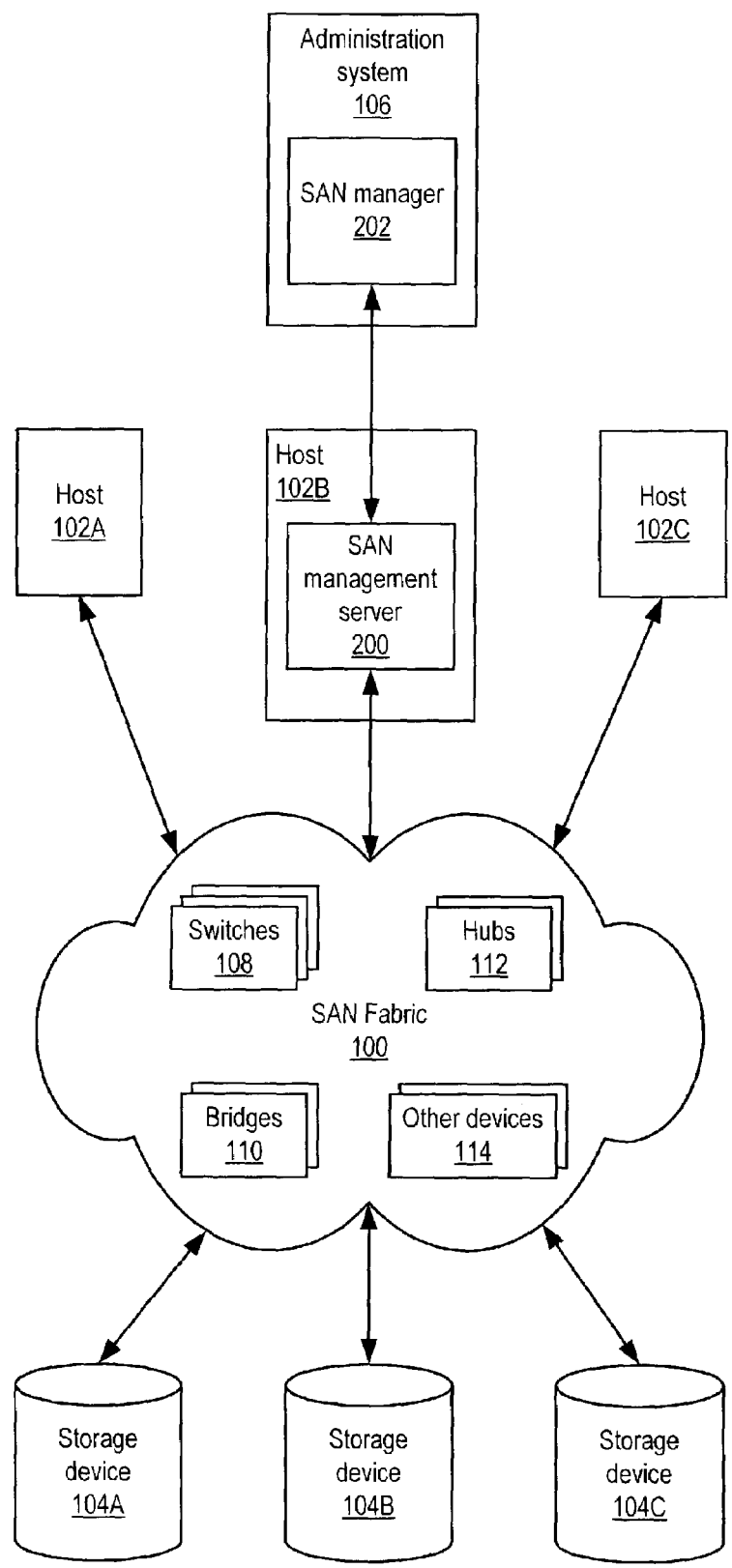
FIG. 7 shows an exemplary SAN implementing an embodiment of the SAN management system.

Embodiments of a centralized Storage Area Network (SAN) management system are described. FIG. 7 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. A SAN may employ Fibre Channel technology. A SAN may include one or more hosts 102 (e.g. hosts 102A, 102B, and 102C), one or more storage devices 104 (e.g. storage devices 104A, 104B, and 104C), and one or more SAN fabrics 100. A SAN may also include one or more administration systems 106. One or more end-user platforms (not shown) may access the SAN, typically via a LAN or WAN connection to one or more of the hosts 102.

Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 102 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the fabric 100 via one or more Host Bus Adapters (HBAs). SAN fabric 100 may enable server-to-storage device connectivity through Fibre Channel switching technology. SAN fabric 100 hardware may include one or more switches 108, bridges 110, hubs 112, or other devices 114 such as routers, as well as the interconnecting cables (for Fibre Channel SANs, fibre optic cables).

Embodiments may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

Embodiments may provide centralized management of SAN-connected devices with automatic discovery, visualization, access control, and policy-based monitoring, alerting and reporting. Embodiments may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other (e.g. I/O buses and networks.)

Embodiments may provide data-centric management from host applications through interconnects to the storage resources, regardless of the underlying hardware and operating system(s). SAN management may occur at physical and logical levels to maintain control regardless of the underlying device environment. With the discovery of host attributes like OS platform, OS handles and IP address, the critical link associating logical devices to a host 102 and its applications may be made.

One embodiment may include a SAN management server 200 and one or more SAN managers 202. SAN management server 200 may discover SAN objects and their attributes, and may provide event management, policy management, and/or notification services. SAN management server 200 may explore the SAN to make data available to client applications, including SAN manager 202. SAN management server 200 may run in a variety of operating systems including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, an operating system rescan may be automatically initiated so that the new device is immediately available for use by the volume manager on the host.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards (e.g. MS/CT, GS-3, SNMP, Fibre Alliance MIB, ANSI T11, SCSI, CIM (Common Information Model), vendor-specific extensions, etc.). Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet. In one embodiment, a storage administrator may assign customized attributes to devices in the SAN for use in tracking information such as physical location, account code, installation date and asset tag number.

SAN manager 202 may provide a central management interface for various SAN management tasks, and may provide a graphical user interface for displaying the information (e.g. XML data) compiled by and received from SAN management server 200 in graphical and/or textual format, and may provide a user interface for accessing various features of the SAN management system such as tools and utilities. SAN manager 202 may run on any of a variety of end-user platforms coupled to one or more of the hosts 102, typically via a LAN or WAN, or alternatively may run on one of the hosts 102, including the host 102 that includes SAN management server 200. One embodiment may provide in-context launch support for element managers supplied by device vendors to provide vendor-specific management. In one embodiment, to directly manage a device, the administrator may telnet to the device via the SAN manager.

Embodiments may provide customizable, intuitive views into a SAN based on host 102, device, fabric 100, or storage groups, as well as real-time alerts to diagnose and avoid outages. In one embodiment, SAN manager 202 may serve as a centralized point from which a user may view information about a SAN, including, but not limited to, information about the SAN's topology and heterogeneous components. In one embodiment, SAN manager 202 may provide a graphical user interface (GUI) to display information from the SAN access layer and other SAN management server components.

In one embodiment, SAN manager 202 may provide a GUI for facilitating management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths (routes) in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

One embodiment may provide a real-time alert viewer that may monitor heterogeneous device status, and may provide proactive management capabilities in the SAN environment. Through policies, the status and performance of the device(s) may be monitored, and alerts may be generated when behavior falls outside acceptable boundaries. Embodiments may enable intelligent monitoring through user-definable threshold levels and may perform actions automatically as well as notify administrators of critical events in real time.

Embodiments may provide both real-time and historical performance data for critical service-level parameters such as connectivity, available space and throughput. One embodiment may enable real-time performance charting of SAN devices. Embodiments may monitor interconnect and storage devices in real time, and may be used to display information about the various SAN devices such as current load/status. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment may include a SAN reporter that enables the user to generate and view reports on details of the SAN. In one embodiment, the SAN manager may serve as a centralized point from which reports may be generated and viewed. Embodiments may provide both real-time and historical performance data for critical service-level parameters such as connectivity, available space and throughput. In one embodiment, the SAN management server may collect SAN data that may be provided as real-time and/or historical performance data to the SAN reporter for use in generating SAN performance reports. One embodiment may include "out-of-the-box" or predefined reports that allow users to inventory and analyze their SANs. Embodiments may provide detailed capacity reports to aid in growth planning and gathers detailed information for use in chargeback reports. One embodiment may track LUN allocation to hosts as well as to storage groups, distilling real-time and historical reports that show where storage resources are being consumed.

Figure 8:
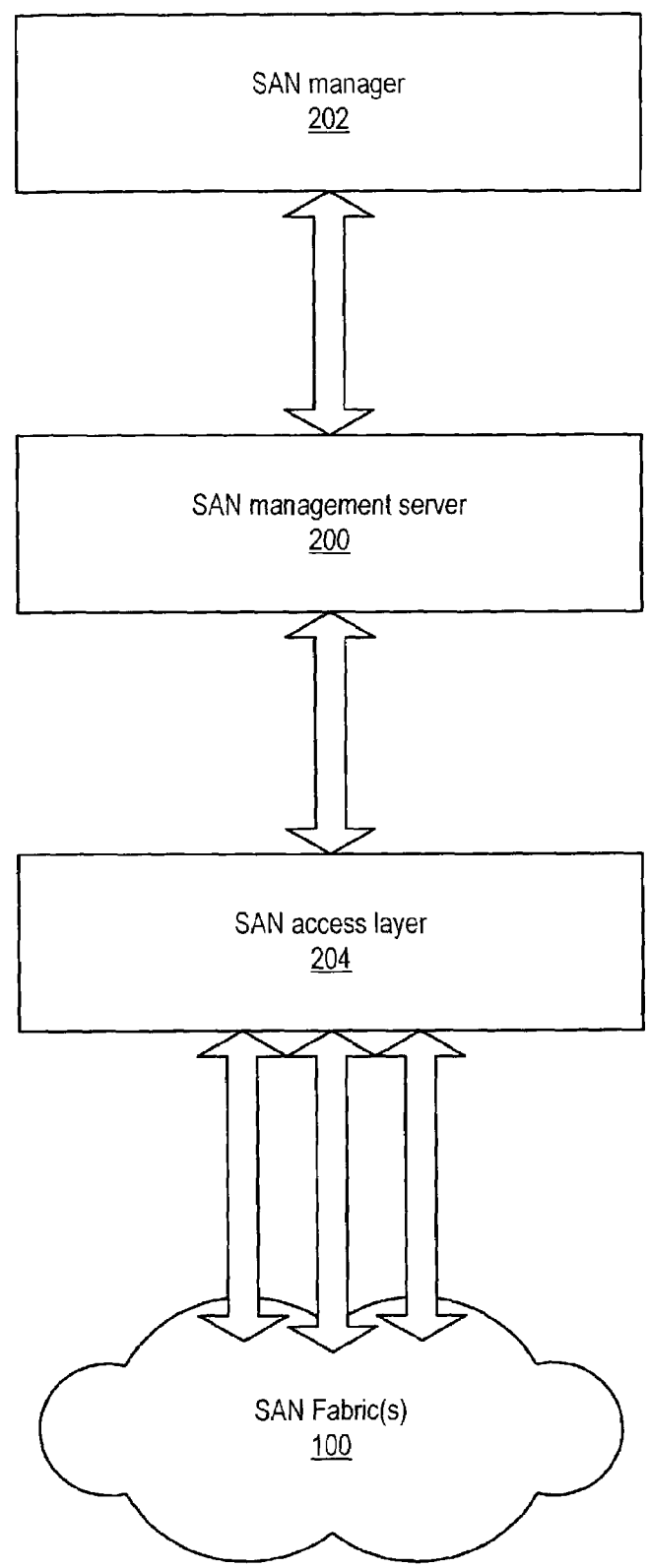
FIG. 8 illustrates the architecture of the SAN management system according to one embodiment.

FIG. 8 illustrates the architecture of the SAN management system according to one embodiment. This embodiment may be based on distributed client-server architecture, and may be divided into components that may include a SAN manager 202, a SAN management server 200, and a SAN access layer 204. The functions of SAN management server 200 may include one or more of, but are not limited to: automatically discovering SAN-attached objects including hosts, HBAs, switches and storage devices; maintaining a data store of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

By discovering objects and the relationship of these objects to each other, SAN access layer 204 may maintain a real-time topology of the SAN. SAN access layer 204 may also directly interface with switches on one or more fabrics to manage the zoning of storage resources. SAN access layer 204 may discover additional information about objects on the SAN that SAN management server 200 cannot discover directly, such as devices on a separate zone or fabric 100.

SAN manager 202 may be a central point for the user to perform one or more of SAN management tasks including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. In one embodiment, other applications, such as a Web browser, may function as clients to SAN management server 200. In one embodiment, multiple SAN managers 202 may connect simultaneously with SAN management server 200. One embodiment may include a command line interface that enables the user to query and modify SAN management server alarm service objects, configuration settings and perform other related SAN management system tasks.

Figure 9:
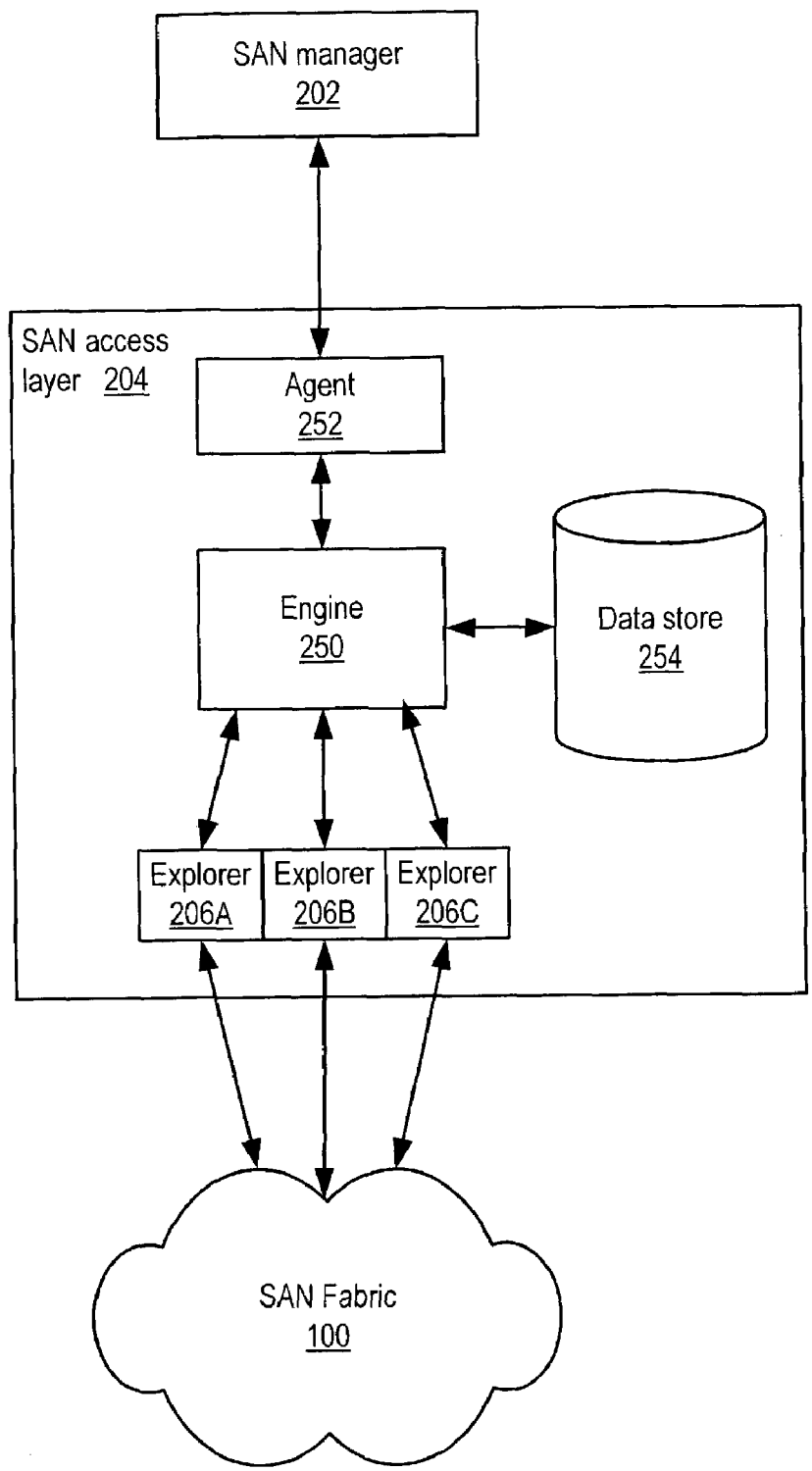
FIG. 9 illustrates the architecture of the SAN access layer according to one embodiment.

FIG. 9 illustrates the architecture of SAN access layer 204 according to one embodiment. In one embodiment, SAN access layer 204 may include an engine 250 that may perform one or more functions which may include, but are not limited to, coordinating the activity of explorers 206, managing changes to data store 254, and performing zoning operations by communicating with switches on fabric 100. In one embodiment, SAN access layer 204 may include one or more explorers that provide an interface to different types of heterogeneous SAN components so that the SAN management system may provide a common data representation for heterogeneous SAN components. Explorers 206 may communicate with the SAN components over Fibre Channel (in-band) and/or Ethernet (out-of-band) connections to inventory the SAN. Each explorer may communicate with a specific type of device using a protocol available for that specific type of device.

Once the SAN is discovered, SAN access layer 204 may continue to monitor the SAN and may update data store 254 as new events occur on the SAN. In one embodiment, SAN access layer 204 may periodically examine the SAN, for example to discover or determine objects that are added, objects that are removed, and connections that are pulled. In one embodiment, data gathered by the explorers may be aggregated into data store 254, which may be updated with real-time information about objects on the SAN. In one embodiment, SAN access layer engine 250 may manage data store 254. In one embodiment, data store 254 may be an embedded, ODBC-compliant, relational database. In one embodiment, data from the database may be imported into a data warehouse to track changes and analyze the SAN over periods.

In one embodiment, SAN access layer 204 may include an agent 252 that translates information from data store 254 into formatted files (e.g. XML files), which may be provided to client applications such as SAN manager 202 or Web browsers. Agent 252 may also enforce user authentication for commands sent to SAN management server 200, and may handle communication between SAN management server 200 and any hosts running a SAN access layer remote (described below).

In one embodiment, SAN manager 202 is a client of SAN access layer 204, and may graphically and/or textually display objects discovered by SAN access layer 204. In one embodiment, SAN manager 202 may open a connection (e.g. TCP/IP socket) with SAN access layer agent 252 and send a message (e.g. an XML message) requesting data stored in data store 254. Upon receiving the request, SAN access layer engine 250 may dynamically create a document (e.g. an XML document) describing the SAN topology. SAN access layer agent 252 then may send this document to SAN manager 202. Once SAN manager 202 successfully receives the message, SAN access layer agent 252 may close the connection. When SAN manager 202 receives the document, it may read the file and display, in graphical and/or textual format, the information the document provides about the SAN.

In one embodiment, the data generated by SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

In one embodiment, SAN access layer 204 may be configured for discovery and device communication through a configuration file. The configuration file may include one or more parameters for the SAN access layer and/or globally for the explorers. Each type of explorer may have a section in the configuration file that may include one or more parameters specific to the particular type of explorer.

Figure 10:
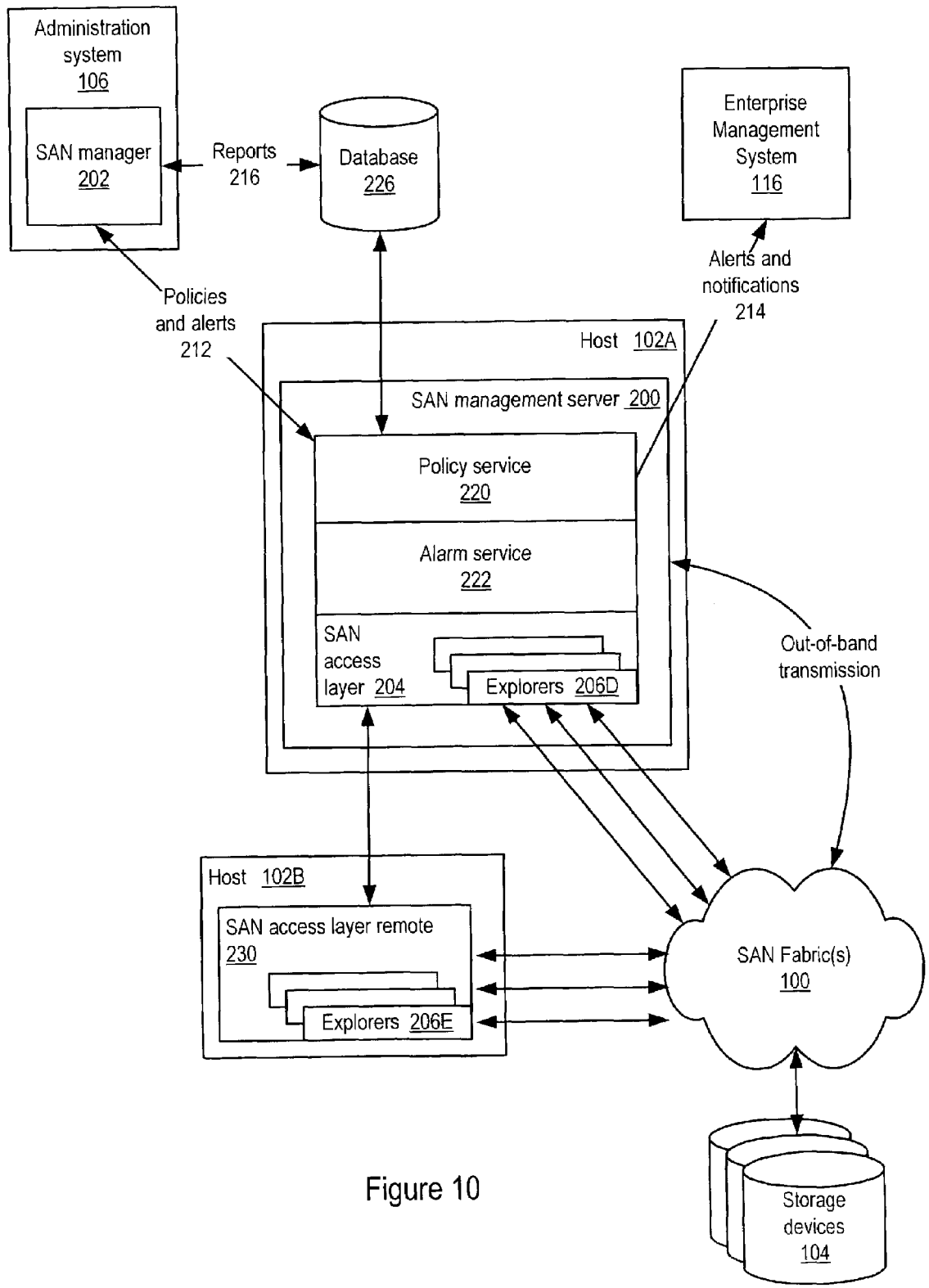
FIG. 10 illustrates an exemplary SAN including a SAN management system and further illustrates the architecture and operation of the SAN management system according to one embodiment.

FIG. 10 illustrates an exemplary SAN and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, SAN access layer 204 may be a component or "layer" of SAN management server 200. SAN management server 200 may also include a policy service 220 and an alarm service 222.

In one embodiment, one or more explorers 206D may be included within SAN access layer 204. In one embodiment, SAN access layer 204 may aggregate information gathered by explorers 206D into a SAN access layer 204 data store. Once the SAN is discovered, SAN access layer 204 may periodically examine the SAN for objects that are added, objects that are removed, and connections that are pulled. In one embodiment, new explorers 206 may be added as needed or desired. For example, if a new type of SAN device is added to the SAN, or an existing type of SAN device is modified or upgraded, an explorer 206 may be added or updated to correctly communicate with the new or updated type of SAN device.

Explorers 206 may use different methods to discover information about heterogeneous SAN objects. In one embodiment, explorers 206 may query objects on the SAN to retrieve a standard set of attributes for each type of object. The terms "information" and "details" may be used to describe the different kinds of data about a SAN that may be discovered, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Explorers 206 may be categorized into types including, but not limited to, switch explorers, zoning explorers, disk array explorers, and Host Bus Adapter (HBA) explorers. Switch explorers may discover switch information such as vendor name, firmware version, and model name. Switch explorers may include, but are not limited to, a management server explorer and an out-of-band switch explorer. A management server explorer may communicate with supported switches over Fibre Channel connections. In one embodiment, the management server explorer may use the Fibre Channel Common Transport (CT) protocol to communicate with switches in fabric 100. The management server explorer may, for example, discover switches in-band over Fibre Channel, obtain switch characteristics, and/or explore port connectivity. In one embodiment, the management server explorer may optionally run over IP networks. For some switches, the management server explorer may run out-of-band. In one embodiment, the management server explorer may perform in-band zoning.

One embodiment may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Zoning explorers may be used as an interface for SAN access layer 204 to communicate with fabric switches to perform discovery and control of zones in the SAN. When users issue zoning commands, SAN access layer 204 may use a zoning explorer to contact the switch to perform the zoning operation. In one embodiment, zoning explorers may communicate with the switches out-of-band. Embodiments may provide zoning explorers specific to fabric switches provided by various switch vendors. In one embodiment, one or more zoning explorers may complete transactions with a switch management server (name server) to discover zone names and attributes and to perform switch zoning commands.

HBA explorers may discover information about SAN-connected storage devices 104 that are zoned to a host 102 that is running a SAN management server 200 or where a SAN access layer remote 230 (described below) resides. The HBA explorer may interact with a host 102 to discover HBAs and device paths. A device path may be defined as a route through an interconnect that allows two or more devices to communicate. In one embodiment, an HBA explorer may not discover locally attached storage (e.g. disks or other devices attached through a SCSI or IDE controller). If these storage devices have OS handles, then the HBA explorer may return LUN names and attributes. An OS handle may be used by the operating system to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Disk array explorers may provide information about array names and their attributes, such as number of ports and the number of disks contained in an array. Disk array explorers may discover disk arrays/enclosures and their LUNs. Disk array explorers may pass LUN management commands to the array's management interface (e.g. CCS or SYMCLI) to execute. In one embodiment, disk array explorers may discover LUNs that are not masked to discovered hosts. SAN access layer 204 may include disk array explorers specific to disk arrays of various vendors. In one embodiment, disk array explorers may start when SAN access layer 204 starts. In one embodiment, the disk array explorers may check to see if host 102 has a management interface. If host 102 does not have the management interface, the corresponding explorer may be disabled. If the management interfaces are present, the explorers may determine if the host has access to any LUNs exported by the array. If any LUNs are available, the explorers may attempt to discover the array using the OS handle of the LUN. In one embodiment, some disk array explorers may use an out-of-band network protocol such as SNMP to communicate directly with the disk array controller. IP addresses for each disk array may be supplied for SAN access layer 204 discovery and communication. In one embodiment, SAN access layer 204 may communicate with a disk array through the array's management interface. In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order to communicate with the arrays.

In one embodiment, SAN access layer 204 may automatically discover information for each Addressable Unit (LUN) that is under the control of a volume manager. In one embodiment, SAN management server 200 may discover information about HBAs on other hosts 102 attached to fabrics 100 discovered by SAN management server host 102A.

One embodiment may include a SAN access layer remote 230 that may be installed on one or more other hosts 102 in the SAN, if any, to assist SAN management server 200 in discovering the entire SAN. In one embodiment, SAN access layer remote 230 may be installed on every host 102 on the SAN (excepting the host including the SAN access layer 204) to provide complete and accurate discovery. In one embodiment, each installation of SAN access layer remote 230 may include one or more explorers 206E. In one embodiment, explorers 206E may include one or more explorers 206 that may also be used by SAN access layer 204, such as a management server explorer and an HBA explorer. In one embodiment, explorers 206E may also include an out-of-band switch explorer. In one embodiment, SAN access layer 204 and each installation of SAN access layer remote 230 may each include a set of one or more explorers 206 that may be determined by the discovery requirements and/or contents of the region of the SAN visible to the host 102 on which SAN access layer 204 or the installation of SAN access layer remote 230 resides. Each installation of SAN access layer remote 230 may provide information gathered by explorers 206E to SAN access layer 204, which may aggregate this information into SAN access layer 204 data store. In one embodiment, SAN management server 200 communicates with SAN access layer remote(s) 230 across an HTTP connection. In one embodiment, SAN management server 200 may use XML to communicate with SAN access layer remote(s) 230. Other embodiments may use other connections and other communications protocols.

In one embodiment, to get detailed information about a remote host 102, SAN access layer remote 230 may be installed on the host 102, and the host 102 may be added to a SAN access layer configuration file on SAN management server 200. In one embodiment, a host 102 running SAN access layer remote 230 may be specified as either a "Host" or an "In-Band Host" in the SAN access layer configuration file. The "Host" entry may be used to define other hosts 102 attached to the SAN. The "In-Band Host" entry may be used to define at least one SAN access layer remote host 102 per each fabric 100 that is not attached to and thus not discovered by SAN management server 200. In one embodiment, if SAN access layer remote 230 is not installed on a host 102, SAN management server 200 may still discover the HBA, and the enclosure utility may be used to accurately visualize the host in SAN manager 202's user interface.

In one embodiment, policy-based management may enable the monitoring of conditions on a SAN and may facilitate quick response when problems occur. Conditions that may be monitored may fall into one or more categories of interest to storage administrators. Embodiments may use one or more methods for monitoring conditions on a SAN. These methods may include, but are not limited to, out-of-band polling (e.g. SNMP polling), traps (e.g. SNMP traps) and SAN access layer 204. SAN access layer 204 may provide notification of SAN events such as the addition or deletion of SAN components such as SAN fabrics, switches and arrays. One embodiment may monitor conditions in-band, e.g. using the Fibre Channel Common Transport (CT) protocol.

Among other SAN monitoring methods, SAN management server 200 may receive SNMP traps from elements on the SAN. To monitor conditions on a SAN using SNMP traps, some SAN objects may send SNMP traps to SAN management server 200 when an event happens. SNMP-capable devices on the SAN may be configured to send traps to the host 102A running SAN management server 200. In one embodiment, these traps are asynchronous, so the SAN management system cannot poll such an object to determine the current condition. This embodiment may be dependent on the trap sender to report when a condition changes by sending additional traps. In another embodiment, objects may be polled directly to determine the current condition. In one embodiment, to monitor an object on a SAN, the object may include an SNMP agent that is configured to accept SNMP polls and to send SNMP traps.

One embodiment may include collectors. A collector may be a path or channel through which a specific type of data is gathered for a specific object type. Collectors may include one or more of, but are not limited to, collectors for object availability, environmental conditions, device errors, and SAN traffic. Collectors may monitor properties such as switch port status, dropped frames, disk temperature, link failures and so on, which may be evaluated by policy service 220 to create an accurate composite status of the SAN. In one embodiment, the status of devices may be displayed on a topology map of a SAN manager 202 user interface, for example using color-coded icons. In one embodiment, these collectors may be based on devices' SNMP MIB variables. One embodiment may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Collector data may be used in real-time collector graphs, the policy engine, and the SAN reporter, for example.

One embodiment may include a policy service 220 that manages policies associated with objects on the SAN. Policies may be rules used to help manage a SAN by automating responses to certain events and conditions. Policies may detect when something goes wrong, and may be used to anticipate and handle problems before they occur. A policy may indicate a particular object or type of object to monitor. In general, any object for which at least one collector is provided may be monitored. Objects that may be monitored include, but are not limited to, fabrics 100, switches, switch ports, hosts 102, and disk arrays. One embodiment may include a set of policies that monitor SAN management server 200. A policy may include a description of a condition to monitor on an object, such as a high percentage of bandwidth utilization on a switch port, and a set of actions to take when that condition is met. A policy may indicate one or more actions to be taken when the condition is detected. In one embodiment, policy service 220 may be integrated with SAN manager 202, permitting users to view what policies are in effect on their SAN, to define and modify policies, and to generate inventory and performance reports based on the conditions monitored by policy service 220. In one embodiment, SAN manager 202 may include a policy utility to facilitate policy creation and maintenance. The policy utility may lead a user through the steps of providing the information described above to create user-defined policies. The user may use the policy utility to make changes in predefined or user-defined policies as desired.

One embodiment may include a policy engine that performs the instructions described in all policies enabled on the SAN. In one embodiment, the policy engine may be a component or process of policy service 220. When the objects on the SAN are discovered, collectors corresponding to the objects may be determined and the relevant collectors may be registered with the policy engine. The policy engine then may receive a stream or streams of real-time collector data and compare data values with the conditions described in its policies. When the alarm condition for a particular policy is met, the policy engine performs the actions described in the policy.

An alarm is a signal that is generated by a policy when the condition specified in the policy is detected or evaluated as true. An alarm may be triggered if the condition and alarm action are configured in the policy. An alarm is an internal signal used by the SAN management system. An alert to SAN manager 202 is a configurable response that may result from an alarm being triggered. When an alarm is triggered, the alarm may be referred to as active. In one embodiment, alarms may be dynamic—the alarm resets itself automatically when the condition monitored by the policy returns to a specified "clear state." The clear state for a condition may specified either manually or automatically, depending on whether the condition is a threshold or a textual comparison condition. One embodiment may include an alarm service 222 that may monitor and collect status and performance information from the SAN using both out-of-band (e.g., SNMP) and SAN access layer 204 events. This collector information may be fed into policy service 220 to trigger policy actions and for logging for reporting purposes. In one embodiment, data collected by the alarm service may be logged in database 226.

The conditions available for a policy may be determined by the type of object being monitored. Different types of policy conditions may result in different types of alarms. There may be different types of conditions for various objects managed by SAN management server 200. One type of policy is a threshold condition with action policy which may be used to monitor an object and detect when a particular numeric threshold is reached and sustained for a configurable period. Another type of policy is a text comparison condition with action policy that may be used to evaluate a textual state to determine the status or condition of the resource.

For every policy, one or more actions to be taken when the specified condition is detected may be configured. Actions may, for example, perform corrective and/or notification functions. One type of policy action is a console alert, which may send an alert to SAN manager 202 when the specified condition is detected. The desired level of severity associated with the action may be configurable. Another type of policy action is a command or script (e.g., a PERL script) that executes a command or executable file specified for the action. Yet another type of policy action is to send e-mail notification to one or more specified recipients. In one embodiment, policy service 220 may be configured to send traps (e.g. SNMP traps) as notifications to applications. In one embodiment, policy action options may also include paging and Instant Messaging.

In one embodiment specific hardware alerts may be forwarded to alert on the applications that will be affected by the hardware problems. In one embodiment application alerts and/or hardware alerts may be forwarded to create alerts for specific departments. This may preferably provide a top-down alert hierarchy.

In one embodiment, SAN manager 202 may serve as a centralized point from which a SAN administrator or other user may create and manage groups of SAN objects, including groups of heterogeneous components. One embodiment may provide a group utility for creating and managing logical groups of SAN objects including hosts 102, storage device 104 interconnects, other groups, and other objects that may be members of a group. A group may be defined as an arbitrary set of SAN elements defined by an administrator to help organize and provision resources, and may be implemented by storage administrators to identify and manually provision available storage devices 104 that match the quality of service requirements of particular user groups or applications. The group utility may be used to create logical storage groups where device membership may be based on zoning, LUN masking, hosts etc., and may also be based on the need for a collection of devices to be viewed as one entity for activities such as reporting, configuring and monitoring SAN resources.

One embodiment may support one or more types of groups, including, but not limited to, generic groups, storage accounts, and storage groups. In one embodiment, groups may be nested within other groups. Generic groups may include switches, hosts 102, storage devices 104, and/or nested groups of any group type. Storage accounts may include hosts 102, storage devices 104, and/or nested groups (storage accounts or storage groups only). A storage account may include one or more host objects and all the storage that the administrator assigns to them. Storage groups may include storage devices 104 and/or nested groups (storage groups only). Storage groups may be used to categorize storage resources by quality of service criteria including, but not limited to, cost, performance, capacity and location.

The flexible connectivity capabilities of the SAN storage model may pose security risks. Zoning helps alleviate that risk by providing a method of controlling access between objects on the SAN. By creating and managing zones, the user may control host 102 access to storage resources. In one embodiment, the SAN manager may serve as a centralized point from which an administrator or other user may create and manage zones of SAN objects, including zones of heterogeneous components. A zone is a set of objects within a SAN fabric that can access one another. Zones and their member objects may be defined in zoning tables within the switches on the SAN fabric 100. When zoning is implemented on a SAN fabric 100, the switches consult the zoning table to determine whether one object is permitted to communicate with another object, and restrict access between them unless they share a common membership in at least one zone. Fabric zoning occurs at the level of individual nodes or ports attached to the SAN fabric 100. Zoning-enabled fabrics 100 may include zoning tables that define each zone along with its member objects. These zones function similar to virtual private networks (VPNs) on traditional networks.

There may be one or more ways to use zoning to improve the security and organization of the SAN. Examples of uses of zoning include, but are not limited to: isolating storage resources for different operating environments, such as separating UNIX storage from Windows NT storage; setting aside resources for routine backups; securing areas of the SAN for storage of sensitive data; and creating dedicated resources for closed user groups.

In one embodiment, the SAN management system may provide methods to enforce the access restrictions created by zones on the SAN. These methods may include two methods that correspond to the forms of zoning commonly referred to as soft zoning and hard zoning.

Soft zoning, also called advisory zoning, may be enforced simply by filtering the visibility of objects on the SAN so that an object can only see other objects that share at least one zone membership with the object. At boot time, a SAN host 102 or device requests a list of the World Wide Names (WWNs) on the SAN fabric 100 from the fabric Name Service. The Name Service may consult the zoning table and filter out of its response any WWNs that are not zoned together with the host 102 or device making the request. In this way, a host 102 on the SAN is only made aware of devices whose WWNs are zoned together with the hosts's HBA port. Soft zoning is flexible because it does not rely on an object's physical location on the SAN. If its physical connection to the SAN fabric 100 changes, its zone memberships remain intact because the zone memberships are based on the WWNs of the object's ports. However, soft zoning may have security vulnerability in that it does not actively prevent access between objects that belong to different zones. Even if the Name Service does not supply a SAN host 102 with the WWN of a device that is zoned away from the host 102, a user who knows that WWN (or a hacker trying different combinations of addresses) may still send Fibre Channel packets from the host 102 to that device.

When hard zoning is implemented, a Fibre Channel switch may actively block access to zone members from any objects outside the zone. This may be performed at the level of ports on the switch. Hard zoning may also be referred to as switch port zoning. The switch checks each incoming Fibre Channel packet against its routing table to see whether the packet may be forwarded from the entry port to its destination port. Switch port zoning offers strong security because it actively segregates zone members from the rest of the SAN fabric 100. However, hard zoning may lack the flexibility of soft zoning, since an object attached to a zoned switch port loses its zone membership when it is physically disconnected from that switch port and moved elsewhere on the SAN. New objects attached to the switch port may inherit the zone memberships of that port, so planning and record keeping by the administrator may be needed to avoid breaks in security when moving objects around on the SAN.

In one embodiment, the SAN management system may support the zoning of objects on the SAN including, but not limited to, switch ports, hosts 102, and storage devices 104 including, but not limited to, storage arrays, JBODs, and individual storage devices. In one embodiment, the SAN management system may support switch zoning though application program interfaces (APIs) provided by switch vendors, allowing for both hard (port-level) and soft (advisory, WWN) zoning. Zoning may be implemented and used by storage administrators using one or more SAN management system services, tools and/or utilities for allocating storage resources and managing SAN security, and optionally one or more third-party tools, utilities or applications. In one embodiment, the SAN manager may serve as a centralized point from which a manager or other user may access SAN management system and/or third-party services, tools, applications, and/or utilities to create and manage zones on the SAN, including zones containing heterogeneous SAN objects.

In one embodiment, the SAN management system may provide a zone utility that may facilitate the creation, modification, and deletion of zones. In one embodiment, the zone utility may be provided through the SAN manager. The zone utility may provide storage zone definition, creation and management. The zone utility may be used to administer zones directly and visually; and may reduce or remove the need to use telnet commands or proprietary, hardware-specific Web-based solutions. The zone utility may facilitate the creation of new zones and edits to existing zones. The zone utility may automatically filter the list of objects on the SAN and present a list of objects that are available to be added to a zone. In one embodiment, an object may be zoned based on the World Wide Name (WWN) of the object node, the WWN of an individual port under the object node, or the switch port to which the object is attached. In one embodiment, users may administer zoning though the zone utility or optionally through a command line interface.

There may be no industry-wide standard for zoning, and thus different vendors' switches may implement switch zoning in different ways. Thus, one embodiment of the SAN management system may use a switch-neutral approach to zoning. This embodiment may not specify, for example, whether hard zoning (port-level zoning) or soft zoning (based on WWNs) should be applied in any particular case. In this embodiment, implementation details such as these may be left up to the switch vendor. Embodiments may also provide datapath zoning control for interconnects from vendors such as Brocade, QLogic, and McDATA using the zone utility to abstract the individual interconnects' complex zoning tools to simplify creating, adding to, and deleting zones.

Ensuring that SAN applications have the required storage resources may include providing secure storage from storage devices 104 (e.g. disk arrays, tape backup devices, etc.) to hosts 102 within the SAN. In one embodiment, the SAN management system may integrate storage masking from various array providers, for example Hitachi Data Systems, Compaq and EMC, to hosts 102 in the SAN. LUN (Logical Unit Number) security is the collective name given to the operations involved in making storage device 104 resources available to hosts 102 on a SAN. In one embodiment of the SAN management system, LUN security may provide granular control over host 102 access to individual LUNs within an array or other collection of potentially heterogeneous storage devices. LUN security may include LUN locating or searching, LUN binding, LUN masking, and fabric zoning. In one embodiment, the SAN manager may serve as a centralized point from which the administrator or other user may manage LUN security for heterogeneous SAN components.

A LUN is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller corresponds to a virtual disk.

Figure 11:
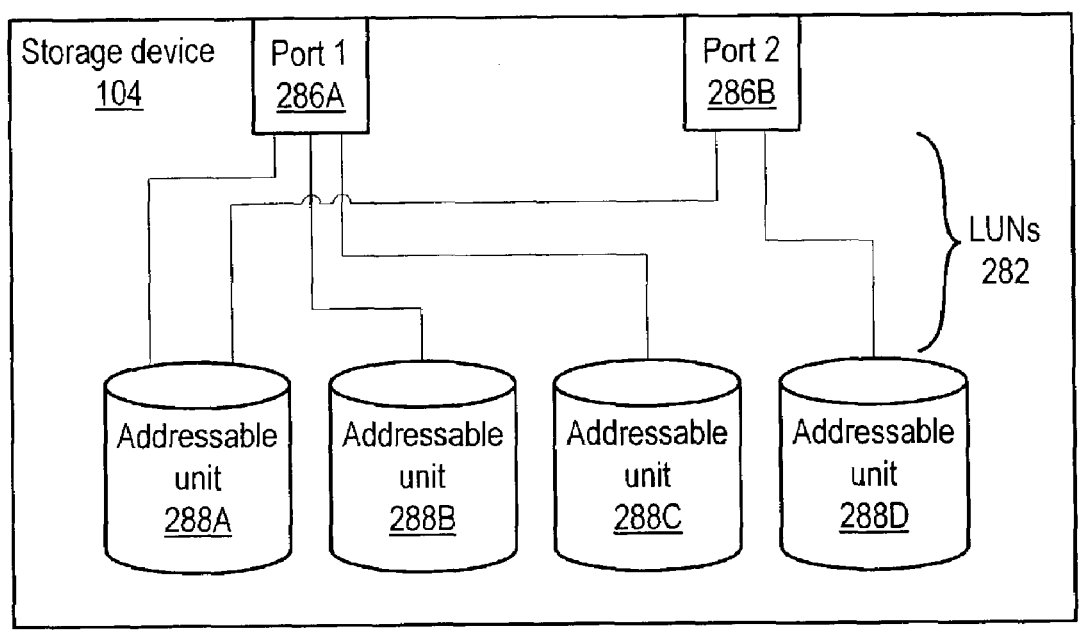
FIG. 11 illustrates LUN binding according to one embodiment.

LUN security may include LUN binding, the creation of access paths between an addressable unit (which may also be referred to as an AddrUnit, an AU, a unit, a volume, a logical unit, a logical disk, or a logical device) within a disk array and a port on the array. FIG. 11 illustrates LUN binding according to one embodiment. In the LUN binding process, an AU 288 is bound to a specified array port 286 (e.g. array port 286A or 286B) in a specified storage device 104 (e.g. a storage system/disk array)). This results in the creation of a LUN 282. AUs 288A, 288B, 288C, and 288D are storage volumes built out of one or more physical discs within the storage device 104. Array ports 286A and 286B are connected to the SAN fabric 100 and function as SCSI targets behind which the AUs 288 bound to those ports 286 are visible. "LUN" is the term for the access path itself between an AU 288 and an array port 286, so LUN binding is actually the process of creating LUNs 282. However, a LUN 282 is also frequently identified with the AU 288 behind it and treated as though it had the properties of that AU 288. For the sake of convenience, a LUN 282 may be thought of as being the equivalent of the AU 288 it represents. Note, however, that two different LUNs 282 may represent two different paths to a single volume. A LUN 282 may be bound to one or more array ports 286. A LUN 282 may be bound to multiple array ports 286, for example, for failover, switching from one array port 286 to another array port 286 if a problem occurs.

Figure 12:
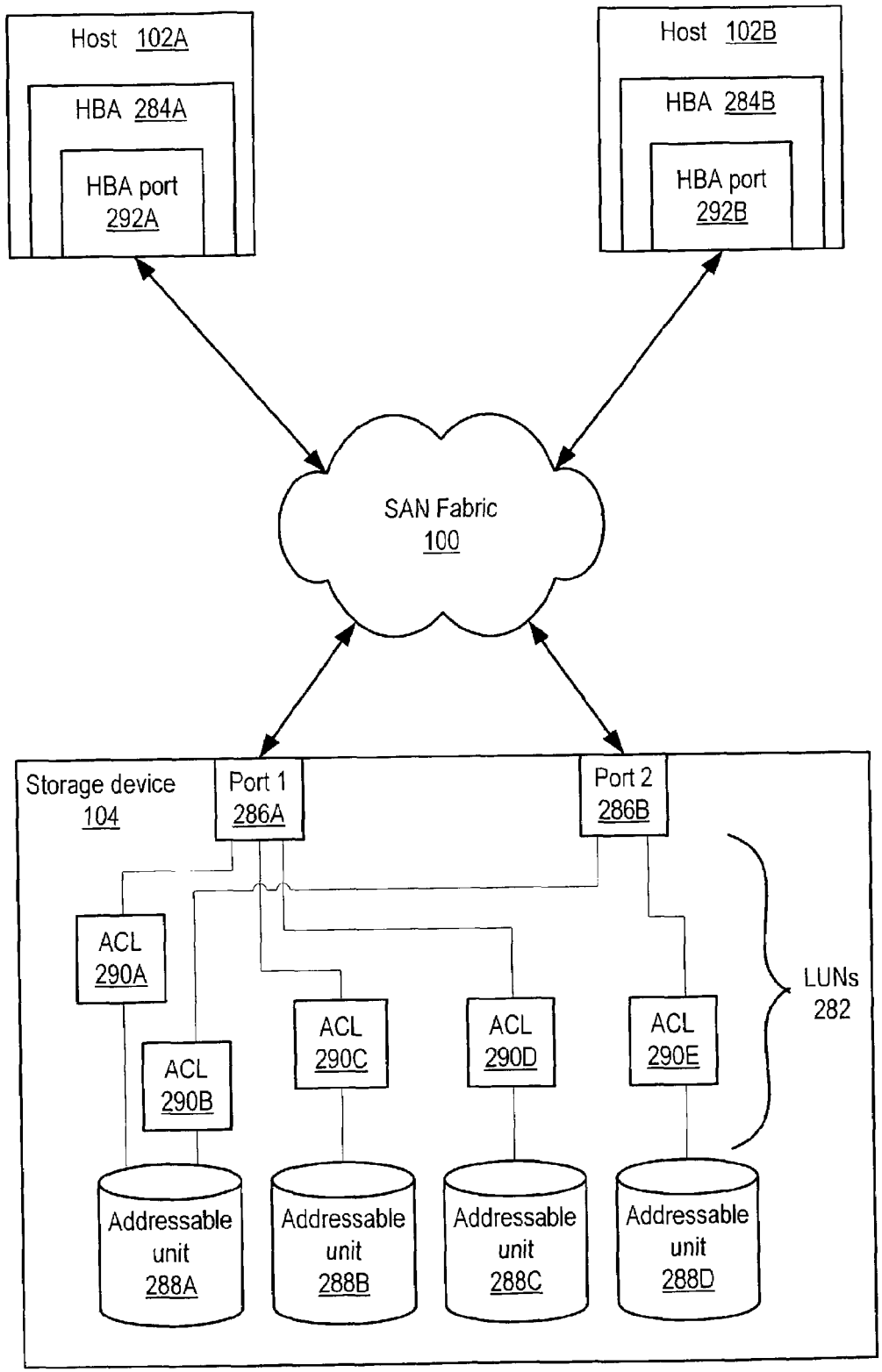
FIG. 12 illustrates LUN masking according to one embodiment.

LUN security may also include LUN masking to enable access to a particular Addressable Unit for a host on the SAN. FIG. 12 illustrates LUN masking according to one embodiment. LUN masking is a security operation that indicates that a particular host 102 (e.g. host 102A or 102B), HBA (Host Bus Adapter) 284 (e.g. HBA 284A or 284B), or HBA port 292 (e.g. HBA port 292A or 292B) is able to communicate with a particular LUN 282. In the LUN masking process, a bound AU 288 (e.g. AU 288A, 288B, 288C or 288D) may be masked to a specified HBA port 292, HBA 284, or host 102 (e.g. all HBAs on the host) through a specified array port 286 in a specified storage device 104. When an array LUN 282 is masked, an entry is added to the Access Control List (ACL) 290 (e.g. ACL 290A, 290B, 290C, 290D, or 290E) for that LUN 282. Each ACL 290 includes the World Wide Name of each HBA port 292 that has permission to use that access path—that is, to access that AU 288 through the particular array port 286 represented by the LUN 282.

LUN masking may be thought of as the removal of a mask between an AU 288 and a host 102 to allow the host to communicate with the LUN 282. The default behavior of the storage device 104 may be to prohibit all access to LUNs 282 unless a host 102 has explicit permission to view the LUNs 282. The default behavior may depend on the array model and, in some cases, the software used to create the AU 288.

Figure 13:
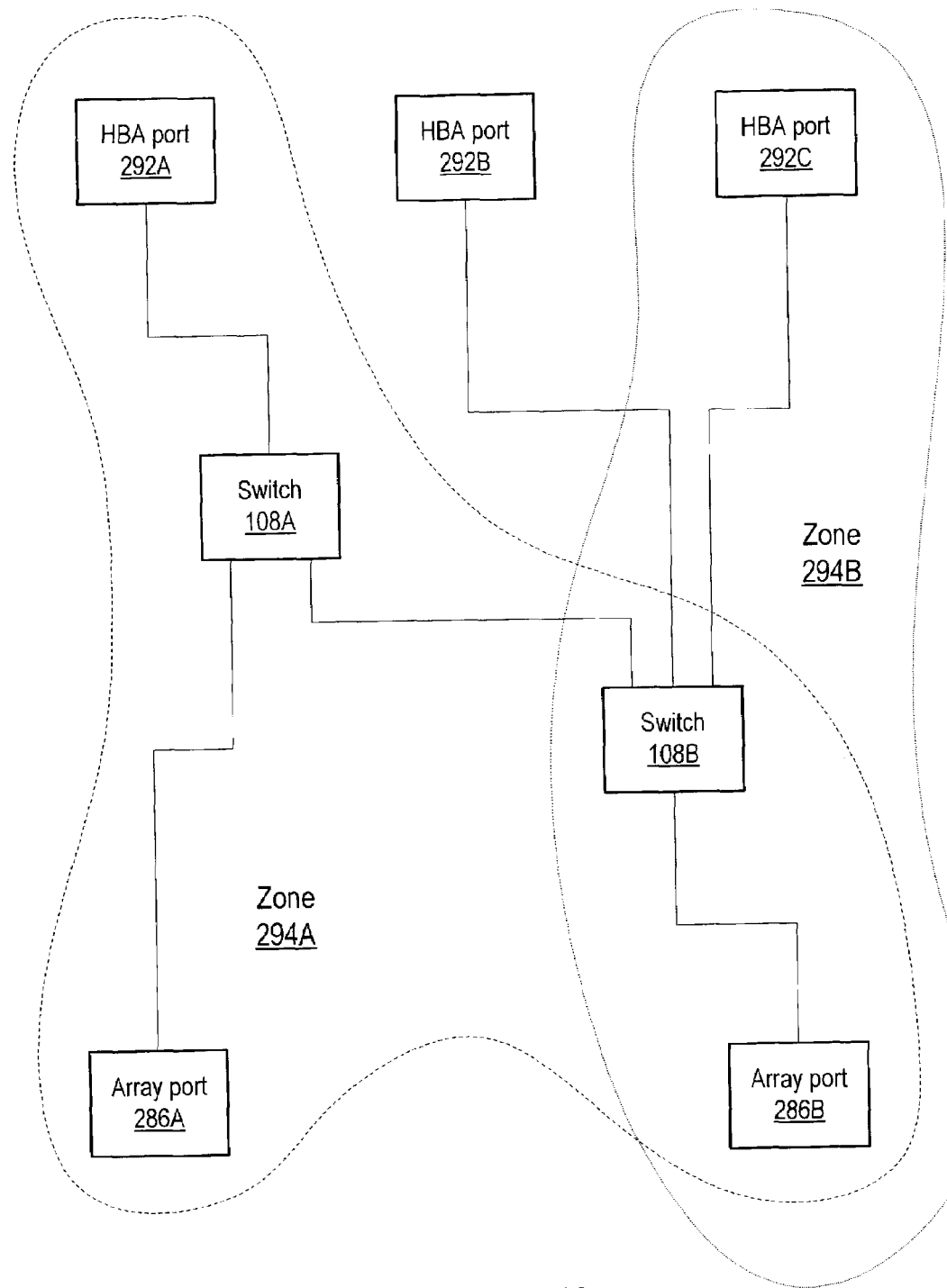
FIG. 13 illustrates fabric zoning according to one embodiment.

LUN security may also include fabric zoning. FIG. 13 illustrates fabric zoning according to one embodiment. After a LUN is masked to an HBA port 292 (e.g. HBA port 292A, 292B or 292C) in a host, the zoning configuration of the SAN fabric 100 may still prevent the host from accessing the AU behind that LUN. In order for the host to see the AU and create an Operating System (OS) handle for it, there must be at least one zone on the fabric 100 that contains both the HBA port 292 (e.g. HBA port 292A, 292B or 292C) and the array port 286 (e.g. array port 286A or 286B) to which the AU is bound. A zoning operation may be required if the HBA port 292 and array port 286 are not already zoned together. Zoning operations may include creating a new zone 294 and adding the array port 286 and the HBA port 292 to an existing zone 294. Zones 294 may also include one or more ports on one or more fabric devices (e.g. switches 108A and 108B) in the device path between the array port 286 and the HBA port 292. Fabric zoning occurs at the level of individual nodes or ports attached to the SAN fabric. Zones and their member objects may be defined in zoning tables within the switches 108 on the SAN fabric. When zoning is implemented on a SAN fabric, the switches 108 consult the zoning table to determine whether one object is permitted to communicate with another object, and restrict access between them unless they share a common membership in at least one zone.

In FIG. 13, zone 294A includes HBA port 292A, the array ports 286A and 286B through which HBA port 292A may access LUNs bound to the array ports 286, and the switch ports on switches 108A and 108B through which HBA port 292A and array ports 286 are coupled. Zone 294B includes HBA port 292C, array port 286B through which HBA port 292C may access LUNs bound to the array port 286B, and the switch port(s) on switch 108B through which HBA port 292C and array port 286B are coupled. HBA ports 292A, 292B and 292C may be on the same host or on different hosts and, if on the same host, on the same HBA or on different HBAs. Array ports 286A and 286B may be on the same storage system or on different storage systems. For more information on zoning, see the description of zoning above.

Figure 14:
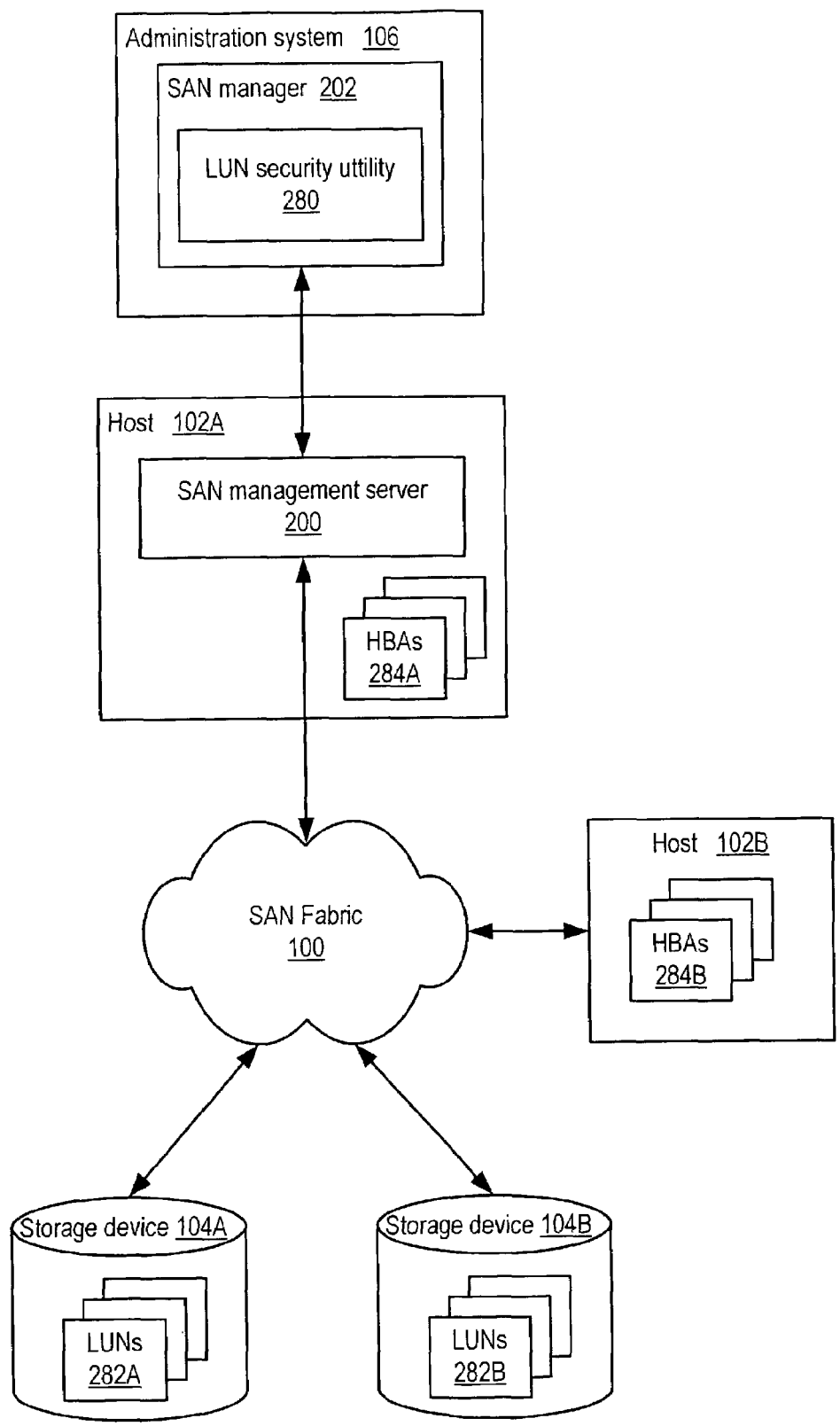
FIG. 14 illustrates a SAN including a LUN security utility according to one embodiment.

In one embodiment as illustrated in FIG. 14, the SAN management server 200 may discover SAN components including, but not limited to, one or more storage devices 104 (e.g. storage devices 104A and 104B) each including one or more addressable storage units and one or more fabric ports for coupling to the SAN, and one or more host systems 102 each including one or more host bus adapters (HBAs) 284 which each provide host adapter ports for coupling to the SAN. The SAN manager 202 client may access the SAN management server to provide a user interface for selecting addressable storage units to be made available to selected host adapter ports and to communicate with the SAN management server to create access paths between selected addressable storage units and selected fabric ports of the storage systems, enable access to the selected addressable storage units for the selected host adapter ports, and zone the selected storage system fabric ports in a common fabric 100 zone with the selected host adapter ports.

In one embodiment, the SAN management system may provide a LUN security utility 280, which may combine LUN security operations including, but not limited to, searching for and locating one or more LUNs 282, LUN selection, LUN to disk array port binding, LUN masking and fabric zoning operations in one utility. In one embodiment, the LUN security utility 280 may be provided to the user through the SAN manager 202 user interface. In one embodiment, the SAN manager may run on an administration system 106. In one embodiment, the LUN security utility 280 may provide a central utility that, through a graphical user interface, guides the user through configuring LUN security operations (finding and selecting one or more LUNs, binding, masking and zoning) and allows the user to execute the configured LUN security operations with a single operation, for example, a single click of a button in the user interface. Thus, the LUN security operations (finding and selecting one or more LUNs, binding, masking and zoning) may be performed as a single operation from the perspective of the user.

In one embodiment, if any portion of the LUN security operation (binding, masking, and/or zoning) configured and initiated by the user from the LUN security utility fails to successfully complete, the LUN security utility may "back out" of the entire configured LUN security operation, and may undo any portions of the LUN security operation already completed and/or leave undone any portions not yet performed. By so doing, the LUN security operation may leave the various SAN components being operated on by the LUN security operation in their original state before the start of the operation if any portion of the operation fails. Thus, LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

The SAN management system may provide a single point of management from logical units of storage devices 104 to interconnect to SAN-connected hosts 102. The LUN security utility 280 may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it).

The LUN security utility 280 may guide users through searching and locating, selecting, binding, masking and zoning operations. The LUN security utility 280 may be used to bind LUNs 282 to ports on the array and further mask the LUN(s) to target host HBA 284 ports. The LUN security utility 280 may include safety controls to ensure that invalid LUN binding and LUN masking configurations are not created. The LUN security utility 280 may support multiple storage array vendors, and thus may serve as a centralized utility for performing LUN security operations for heterogeneous SAN components.

Using the LUN security utility 280, users may specify LUNs 282 and disk array ports to bind. In one embodiment, the SAN management system may provide a LUN query tool for finding and selecting LUNs 282. Users may also use the LUN security utility 280 to select hosts' HBA 284 ports and LUNs 282 for LUN masking/security. The LUN security utility 280 may allow users to select a zone that contains the array port and a host's HBA port(s). If no such zone exists, the LUN security utility 280 may allow users to create a new zone or add the array port and the host's HBA 284 port(s) to an existing zone.

The component of the SAN management system that manages SAN discovery is the SAN access layer (not shown). Functions of the SAN access layer may include discovery and zoning. In one embodiment, the SAN access layer may be a component or "layer" of the SAN management server 200. In one embodiment, the SAN access layer may include one or more explorers (e.g. disk array explorers) that may discover storage devices 104 (e.g. disk arrays and enclosures) and information about the storage devices 104 such as the storage devices' ports, addressable units and LUNs 282. In one embodiment, the SAN access layer may discover LUNs 282 that are not masked to HBA 284 ports on discovered hosts 102 on the SAN. In one embodiment, the SAN access layer may also include one or more explorers (e.g. HBA explorers) that may interact with SAN hosts 102 to discover information about the hosts 102 such as the hosts' HBAs 284, HBA ports and device paths. In one embodiment, the SAN access layer may also include one or more explorers (e.g. zoning explorers) that may discover zone names and attributes Information about discovered SAN objects such as zones, hosts 102, HBAs 284, HBA ports, storage devices 104, array ports, addressable units and LUNs 282 may be provided to the SAN manager 202 and the SAN management server 200 by the SAN access layer. The SAN management server 200 may use the provided information, for example, to configure collectors to collect information on the discovered SAN objects. The SAN manager 202 may use the provided information, as well as collected SAN data from the SAN management server 200, in one or more displays of SAN information.

The user may launch the LUN security utility 280 from the SAN manager 202. The discovered SAN objects (e.g., zones, hosts 102, HBAs 284, HBA ports, storage devices 104, array ports, addressable units and LUNs 282) provided to the SAN manager 202 by the SAN access layer and/or SAN management server 200 may be provided to the user in the LUN security utility 280, and the user may locate and select from the objects when configuring LUN security operations using the LUN security utility 280 as described herein. As examples, array ports and addressable units may be selected for binding to create LUNs 282, LUNs 282 may be located and selected, and hosts 102, HBAs 284 and/or HBA ports may be selected to mask to the LUNs 282; and zones may be created and/or selected to which the HBA 284 ports and LUNs 282 are to be added. After selecting the SAN objects to be operated upon using the LUN security utility 280, the LUN security operations (e.g. binding, masking and zoning) may be performed as a single operation from the perspective of the user through the LUN security utility 280.

The LUN security operations as specified by the user in the LUN security utility 280 may be performed to establish device paths in the SAN. In one embodiment, the SAN access layer may perform the LUN security operations (e.g. binding, masking and zoning) as specified by the user in the LUN security utility 280. In one embodiment, the SAN access layer may pass LUN security commands generated by the LUN security utility to the disk arrays' 102 management interfaces for execution using the disk array explorers. In one embodiment, the SAN access layer may pass LUN security commands generated by the LUN security utility 280 to the hosts 102 for execution using the HBA explorers. In one embodiment, the SAN access layers may pass LUN security commands generated by the LUN security utility 280 to the fabric devices for execution using the zoning explorers.

In one embodiment, the SAN management system may provide a LUN query tool, accessible, for example, from the SAN manager, that may be used to search for and find LUNs on the SAN that match one or more properties, such as device vendor, storage type, capacity, configuration, cost, and location. The LUN query tool may allow the user to further refine the search for LUNs based on the storage group(s) the LUNs are assigned to and/or on their accessibility from specified SAN-attached hosts 102. The LUN query tool may return a list of all LUNs that meets those requirements. The LUN query tool may be used, for example, when performing LUN security operations (e.g. binding, masking and zoning) and when allocating storage to the requester. In one embodiment, after using the LUN Query Tool to generate a list of LUNs that match search criteria, the user may create or edit a LUN attribute and apply the new attribute value across multiple LUNs in-context from the LUN query tool.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
   a host system comprising an application;
   a storage device comprising application data;
   a SAN fabric comprising a plurality of components for coupling the host system to the storage device;
   a system external to the SAN fabric configured to implement a storage path monitor, wherein the storage path monitor is configured to:
   monitor performance metrics of a plurality of paths through the SAN fabric from the host system to the storage device, wherein the application accesses the application data via one of the plurality of paths;
   generating historical performance data for each path of said plurality of paths based on the performance metrics over a period of time;
   determine current quality of service of each of the paths from the monitored performance metrics;
   determine another one of the plurality of paths predicted based on the historical performance data to provide a higher quality of service than the one of the plurality of paths; and
   change the paths so that the application accesses the application data via the other one of the plurality of paths predicted to perform above a quality of service threshold.

2. The SAN as recited in claim 1, wherein the paths are defined by zones on the SAN fabric, and wherein, to change the paths, the storage path monitor is further configured to reconfigure one or more zones so that the application accesses the application data via the other one of the plurality of paths.

3. The SAN as recited in claim 1, wherein, to monitor performance metrics of a plurality of paths through the SAN fabric from the host system to the storage device, the storage path monitor is further configured to monitor one or more performance metrics of one or more components of each path.

4. The SAN as recited in claim 1, wherein, to determine another one of the plurality of paths predicted to provide a higher quality of service than the one of the plurality of paths, the storage path monitor is further configured to apply one or more selection rules to the performance metrics of each of the monitored paths.

5. The SAN as recited in claim 1, wherein, to change the paths so that the application accesses the application data via the other one of the plurality of paths, the storage path monitor is further configured to change the paths to the other one of the plurality of paths if the one of the plurality of paths is performing below a quality of service low threshold.

6. The SAN as recited in claim 1, wherein, to change the paths so that the application accesses the application data via the other one of the plurality of paths, the storage path monitor is further configured to change the paths to the other one of the plurality of paths if the one of the plurality of paths is performing below a quality of service low threshold and the other one of the plurality of paths is predicted to perform above a quality of service high threshold.

7. The SAN as recited in claim 1, wherein the system is further configured to implement a SAN management system configured to discover components of the SAN and to collect information from the components, and wherein, to monitor performance metrics of a plurality of paths through the SAN fabric from the host system to the storage device, the storage path monitor is further configured to access the information collected from the components by the SAN management system.

8. A storage area network (SAN), comprising:
   a host system comprising an application;
   a storage device comprising application data;
   a SAN fabric comprising a plurality of components for coupling the host system to the storage device;
   a system configured to implement a storage path monitor, wherein the storage path monitor is configured to:
   monitor performance metrics of a plurality of paths through the SAN fabric from the host system to the storage device, wherein the application accesses the application data via one of the plurality of paths;
   determine an interval for which quality of service on the one of the plurality of paths is predicted to be below a quality of service threshold from the monitored performance metrics;
   determine another one of the plurality of paths predicted to provide a higher quality of service for the interval than the one of the plurality of paths; and
   change the paths prior to the interval so that the application accesses the application data via the other one of the plurality of paths during the interval.

9. The SAN as recited in claim 8, wherein the paths are defined by zones on the SAN fabric, and wherein, to change the paths, the storage path monitor is further configured to reconfigure one or more zones so that the application accesses the application data via the other one of the plurality of paths.

10. A storage path monitor system, comprising:
    a processor; and
    a memory storing program instructions, wherein the program instructions are executable by the processor to perform the steps of:
    monitor performance metrics of a plurality of paths through a fabric of a storage area network (SAN) from a host system to a storage device, wherein an application on the host system accesses application data on the storage device via one of the plurality of paths;
    generating historical performance data for each path of said plurality of paths based on the performance metrics over a period of time;
    determine current quality of service of each of the paths from the monitored performance metrics;
    determine another one of the plurality of paths predicted based on the historical performance data to provide a higher quality of service than the one of the plurality of paths; and change the paths so that the application accesses the application data via the other one of the plurality of paths predicted to perform above a quality of service threshold;

wherein the storage path monitor system is external to said fabric.

11. The system as recited in claim 10, wherein the paths are defined by zones on the fabric, and wherein, to change the paths, the program instructions are further executable by the processor to reconfigure one or more zones so that the application accesses the application data via the other one of the plurality of paths.

12. The system as recited in claim 10, wherein, to determine another one of the plurality of paths predicted to provide a higher quality of service than the one of the plurality of paths, the program instructions are further executable by the processor to apply one or more selection rules to the performance metrics of each of the monitored paths.

13. The system as recited in claim 10, wherein the system is further configured to implement a SAN management system configured to discover components of the SAN and to collect information from the components, and wherein, to monitor performance metrics of a plurality of paths through the SAN fabric from the host system to the storage device, the storage path monitor is further configured to access the information collected from the components by the SAN management system.

14. A system, comprising:
    means for monitoring performance metrics of a plurality of paths through a fabric of a storage area network (SAN) from a host system to a storage device, wherein an application on the host system accesses application data on the storage device via one of the plurality of paths, wherein said monitoring comprises monitoring performance metrics from a location external to the fabric;
    means for generating historical performance data for each path of said plurality of paths based on the performance metrics over a period of time;
    means for determining current quality of service of each of the paths from the monitored performance metrics;
    means for determining another one of the plurality of paths predicted based on the historical data to provide a higher quality of service than the one of the plurality of paths; and
    means for changing the paths so that the application accesses the application data via the other one of the plurality of paths predicted to perform above a quality of service threshold.

15. A method, comprising:
    monitoring performance metrics of a plurality of paths through a fabric of a storage area network (SAN) from a host system to a storage device, wherein an application on the host system accesses application data on the storage device via one of the plurality of paths, wherein said monitoring comprises monitoring performance metrics from a location external to the fabric;
    generating historical performance data for each path of said plurality of paths based on the performance metrics over a period of time;
    determining current quality of service of each of the paths from the monitored performance metrics;
    determining another one of the plurality of paths predicted based on the historical data to provide a higher quality of service than the one of the plurality of paths; and
    changing the paths so that the application accesses the application data via the other one of the plurality of paths predicted to perform above a quality of service threshold.

16. The method as recited in claim 15, wherein the paths are defined by zones on the fabric, and wherein said changing the paths comprises reconfiguring one or more zones so that the application accesses the application data via the other one of the plurality of paths.

17. The method as recited in claim 15, wherein said determining another one of the plurality of paths predicted to provide a higher quality of service than the one of the plurality of paths comprises applying one or more selection rules to the performance metrics of each of the monitored paths.

18. The method as recited in claim 15, wherein one or more host systems of the SAN implement a SAN management system, the method further comprising:
    the SAN management system discovering components of the SAN and collecting information from the components; and
    wherein said monitoring performance metrics of a plurality of paths through the SAN fabric from the host system to the storage device comprises accessing the information collected from the components by the SAN management system.

19. A computer storage medium storing program instructions, wherein the program instructions are executed to perform the steps of:
    monitoring performance metrics of a plurality of paths through a fabric of a storage area network (SAN) from a host system to a storage device, wherein an application on the host system accesses application data on the storage device via one of the plurality of paths, wherein said monitoring comprises monitoring said performance metrics from a location external to the fabric;
    generating historical performance data for each path of said plurality of paths based on the performance metrics over a period of time;
    determining current quality of service of each of the paths from the monitored performance metrics;
    determining another one of the plurality of paths predicted to provide a higher quality of service than the one of the plurality of paths; and
    changing the paths so that the application accesses the application data via the other one of the plurality of paths predicted to perform above a quality of service threshold.

20. The computer-accessible medium as recited in claim 19, wherein the paths are defined by zones on the fabric, and wherein, in said changing the paths, the program instructions are further configured to implement reconfiguring one or more zones so that the application accesses the application data via the other one of the plurality of paths.

21. The computer-accessible medium as recited in claim 19, wherein, in said determining another one of the plurality of paths predicted to provide a higher quality of service than the one of the plurality of paths, the program instructions are further configured to implement applying one or more selection rules to the performance metrics of each of the monitored paths.

22. The computer-accessible medium as recited in claim 19, wherein one or more host systems of the SAN implement a SAN management system configured to discover components of the SAN and collect information from the SAN components, wherein, in said monitoring performance metrics of a plurality of paths through the SAN fabric from the host system to the storage devices, the program instructions are further configured to implement accessing the information collected from the components by the SAN management system.

* * * * *